(12) United States Patent
Kim

(10) Patent No.: US 12,166,759 B2
(45) Date of Patent: Dec. 10, 2024

(54) SYSTEM FOR REMOTE EXECUTION CODE-BASED NODE CONTROL FLOW MANAGEMENT, AND METHOD THEREFOR

(71) Applicant: PRIBIT Technology, Inc., Seoul (KR)

(72) Inventor: Young Rang Kim, Seoul (KR)

(73) Assignee: PRIBIT Technology, Inc., Seoul (KR)

( * ) Notice: Subject to any disclaimer, the term of this patent is extended or adjusted under 35 U.S.C. 154(b) by 283 days.

(21) Appl. No.: 17/656,152

(22) PCT Filed: Sep. 24, 2020

(86) PCT No.: PCT/KR2020/012927
§ 371 (c)(1),
(2) Date: Mar. 23, 2022

(87) PCT Pub. No.: WO2021/060857
PCT Pub. Date: Apr. 1, 2021

(65) Prior Publication Data
US 2022/0247748 A1 Aug. 4, 2022

Related U.S. Application Data

(63) Continuation-in-part of application No. 16/580,974, filed on Sep. 24, 2019, now Pat. No. 11,381,557, and (Continued)

(30) Foreign Application Priority Data

Aug. 5, 2020 (KR) .................. 10-2020-0098163

(51) Int. Cl.
*H04L 9/40* (2022.01)
(52) U.S. Cl.
CPC ............ *H04L 63/10* (2013.01); *H04L 63/029* (2013.01)

(58) Field of Classification Search
CPC ..... H04L 63/10; H04L 63/029; H04L 63/102; H04L 63/164; H04L 63/0281; H04L 63/101; H04L 63/0209
See application file for complete search history.

(56) References Cited

U.S. PATENT DOCUMENTS 6,076,168 A 6/2000 Fiveash et al.
6,738,909 B1 5/2004 Cheng et al.
(Continued)

FOREIGN PATENT DOCUMENTS

CN 104284385 A 1/2015
CN 105471748 A 4/2016
(Continued)

OTHER PUBLICATIONS

Japanese Office Action issued Dec. 5, 2024 for Japanese Patent Appl. No. 2023136154.
(Continued)

*Primary Examiner* — Vu V Tran
(74) *Attorney, Agent, or Firm* — Seed IP Law Group LLP

(57) ABSTRACT

A method for managing a control flow by a server including: receiving a control flow generation request data packet from the terminal; transmitting a control flow communication code to the terminal; and receiving the result of executing the control flow communication code from the terminal, wherein if the result of executing the control flow communication code is normal, the server generates the control flow with the terminal, and if the execution result value is abnormal, or the execution result is not received from the terminal within a predetermined time, the server blocks the generation of the control flow with the terminal.

20 Claims, 19 Drawing Sheets

Related U.S. Application Data a continuation-in-part of application No. 16/580,866, filed on Sep. 24, 2019, now Pat. No. 11,190,494.

(56) References Cited

U.S. PATENT DOCUMENTS

| | | |
|---|---|---|
| 6,963,982 B1 | 11/2005 | Brustoloni et al. |
| 7,139,276 B1 | 11/2006 | Sitaraman et al. |
| 7,215,667 B1 | 5/2007 | Davis |
| 7,302,496 B1 | 11/2007 | Metzger |
| 7,318,234 B1 | 1/2008 | Dharmarajan |
| 7,346,770 B2 | 3/2008 | Swander et al. |
| 7,606,902 B2 | 10/2009 | Rao et al. |
| 7,760,636 B1 | 7/2010 | Cheriton |
| 7,978,714 B2 | 7/2011 | Rao et al. |
| 8,000,327 B1 | 8/2011 | Minei et al. |
| 8,019,868 B2 | 9/2011 | Rao et al. |
| 8,024,488 B2 | 9/2011 | Salowey et al. |
| 8,289,968 B1 | 10/2012 | Zhuang |
| 8,291,119 B2 | 10/2012 | Rao et al. |
| 8,363,650 B2 | 1/2013 | Rao et al. |
| 8,385,199 B1 | 2/2013 | Coward et al. |
| 8,612,612 B1 | 12/2013 | Dukes et al. |
| 8,843,998 B2 | 9/2014 | Fu et al. |
| 8,892,778 B2 | 11/2014 | Rao et al. |
| 8,897,299 B2 | 11/2014 | Rao et al. |
| 8,923,853 B1 | 12/2014 | Shaw et al. |
| 9,088,564 B1 | 7/2015 | Hobson et al. |
| 9,106,538 B1 | 8/2015 | Asnis |
| 9,143,942 B2 | 9/2015 | Agarwal et al. |
| 9,148,408 B1 | 9/2015 | Glazemakers |
| 9,240,938 B2 | 1/2016 | Dimond et al. |
| 9,252,972 B1 | 2/2016 | Dukes et al. |
| 9,356,866 B1 | 5/2016 | Sivaramakrishnan et al. |
| 9,402,002 B1 | 7/2016 | Hao et al. |
| 9,578,052 B2 | 2/2017 | Cp et al. |
| 9,715,597 B2 | 7/2017 | Smith et al. |
| 9,860,208 B1 | 1/2018 | Ettema et al. |
| 9,984,230 B2 | 5/2018 | Pikhur et al. |
| 10,033,766 B2 | 7/2018 | Gupta et al. |
| 10,129,207 B1 | 11/2018 | Wan et al. |
| 10,162,767 B2 | 12/2018 | Spurlock et al. |
| 10,176,344 B2 | 1/2019 | Smith et al. |
| 10,205,743 B2 | 2/2019 | Cp et al. |
| 10,243,833 B2 | 3/2019 | Tang et al. |
| 10,326,672 B2 | 6/2019 | Scheib et al. |
| 10,339,303 B2 | 7/2019 | Mehta et al. |
| 10,402,577 B2 | 9/2019 | Knapp et al. |
| 10,484,334 B1 | 11/2019 | Lee et al. |
| 10,659,434 B1 | 5/2020 | Kim et al. |
| 10,659,462 B1 | 5/2020 | Kim et al. |
| 10,764,249 B1 | 9/2020 | Kommula et al. |
| 10,785,111 B2 | 9/2020 | Hill et al. |
| 10,812,576 B1 | 10/2020 | Yuan et al. |
| 10,903,990 B1 | 1/2021 | Ladd et al. |
| 11,271,777 B2 | 3/2022 | Kim et al. |
| 2001/0039576 A1 | 11/2001 | Kanada |
| 2002/0161905 A1 | 10/2002 | Haverinen et al. |
| 2002/0163920 A1 | 11/2002 | Walker et al. |
| 2003/0055978 A1 | 3/2003 | Collins |
| 2003/0131263 A1 | 7/2003 | Keane et al. |
| 2003/0188192 A1 | 10/2003 | Tang et al. |
| 2003/0212900 A1 | 11/2003 | Liu et al. |
| 2004/0081150 A1 | 4/2004 | Chiang et al. |
| 2004/0088385 A1 | 5/2004 | Blanchet et al. |
| 2004/0190449 A1 | 9/2004 | Mannal et al. |
| 2004/0215819 A1 | 10/2004 | Tsuruoka et al. |
| 2005/0060328 A1 | 3/2005 | Suhonen et al. |
| 2005/0111399 A1 | 5/2005 | Sapienza et al. |
| 2005/0273853 A1 | 12/2005 | Oba et al. |
| 2005/0283604 A1 | 12/2005 | Deshpande et al. |
| 2006/0018291 A1 | 1/2006 | Patel et al. |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0037071 A1 | 2/2006 | Rao et al. |
| 2006/0153067 A1 | 7/2006 | Vasseur et al. |
| 2006/0159029 A1 | 7/2006 | Samuels et al. |
| 2006/0182111 A1 | 8/2006 | Wahl |
| 2006/0262808 A1 | 11/2006 | Lin et al. |
| 2007/0147421 A1 | 6/2007 | Kim |
| 2007/0186100 A1 | 8/2007 | Wakameda |
| 2007/0189486 A1 | 8/2007 | Ise |
| 2008/0080509 A1 | 4/2008 | Khanna et al. |
| 2008/0130515 A1 | 6/2008 | Vasseur |
| 2008/0148379 A1 | 6/2008 | Xu et al. |
| 2008/0162924 A1 | 7/2008 | Chinitz et al. |
| 2008/0313240 A1 | 12/2008 | Freking et al. |
| 2009/0077618 A1 | 3/2009 | Pearce et al. |
| 2009/0245204 A1 | 10/2009 | Voyer et al. |
| 2009/0287955 A1 | 11/2009 | Matsumoto et al. |
| 2010/0002693 A1 | 1/2010 | Rao et al. |
| 2010/0011056 A1 | 1/2010 | Bryson et al. |
| 2010/0024026 A1 | 1/2010 | Ylonen et al. |
| 2010/0061253 A1 | 3/2010 | Kaminsky et al. |
| 2010/0199325 A1 | 8/2010 | Raleigh |
| 2010/0306816 A1 | 12/2010 | Mcgrew et al. |
| 2011/0032868 A1 | 2/2011 | Huang et al. |
| 2011/0158237 A1 | 6/2011 | Mcdysan et al. |
| 2011/0161416 A1 | 6/2011 | Mcdysan et al. |
| 2011/0261723 A1 | 10/2011 | Yamato et al. |
| 2012/0014314 A1 | 1/2012 | Chen et al. |
| 2012/0084368 A1 | 4/2012 | Go et al. |
| 2012/0303835 A1 | 11/2012 | Kempf et al. |
| 2012/0304276 A1 | 11/2012 | Legacy et al. |
| 2013/0054761 A1 | 2/2013 | Kempf et al. |
| 2013/0083799 A1 | 4/2013 | Xie et al. |
| 2013/0128892 A1 | 5/2013 | Rao et al. |
| 2013/0163470 A1 | 6/2013 | Chidambaram et al. |
| 2013/0166720 A1* | 6/2013 | Takashima ............ H04L 41/00 709/223 |
| 2013/0232263 A1 | 9/2013 | Kelly et al. |
| 2013/0318345 A1 | 11/2013 | Hengeveld |
| 2013/0322255 A1 | 12/2013 | Dillon |
| 2013/0336159 A1 | 12/2013 | Previdi et al. |
| 2014/0101716 A1* | 4/2014 | Touboul ................ G06F 21/606 726/1 |
| 2014/0108668 A1 | 4/2014 | Zhang et al. |
| 2014/0156720 A1 | 6/2014 | Janakiraman et al. |
| 2014/0211799 A1 | 7/2014 | Yu et al. |
| 2014/0237137 A1 | 8/2014 | Ervin et al. |
| 2014/0237539 A1 | 8/2014 | Wing et al. |
| 2014/0241247 A1 | 8/2014 | Kempf et al. |
| 2014/0301396 A1 | 10/2014 | Hong et al. |
| 2014/0301397 A1 | 10/2014 | Zhou |
| 2014/0334488 A1 | 11/2014 | Guichard et al. |
| 2014/0359159 A1 | 12/2014 | Diaz-Cuellar |
| 2015/0074756 A1 | 3/2015 | Deng et al. |
| 2015/0085664 A1 | 3/2015 | Sachdev et al. |
| 2015/0109967 A1 | 4/2015 | Hogan et al. |
| 2015/0121449 A1 | 4/2015 | Cp et al. |
| 2015/0188949 A1 | 7/2015 | Mahaffey et al. |
| 2015/0281060 A1 | 10/2015 | Xiao |
| 2015/0281131 A1 | 10/2015 | Bhat et al. |
| 2015/0281173 A1 | 10/2015 | Quinn et al. |
| 2015/0341259 A1 | 11/2015 | Li et al. |
| 2015/0347768 A1 | 12/2015 | Martin et al. |
| 2016/0092700 A1 | 3/2016 | Smith et al. |
| 2016/0094661 A1 | 3/2016 | Jain et al. |
| 2016/0105471 A1 | 4/2016 | Nunes et al. |
| 2016/0142293 A1 | 5/2016 | Hu et al. |
| 2016/0180092 A1 | 6/2016 | Aktas |
| 2016/0182550 A1 | 6/2016 | Spurlock |
| 2016/0191380 A1 | 6/2016 | De et al. |
| 2016/0197830 A1 | 7/2016 | Ulevitch et al. |
| 2016/0226779 A1 | 8/2016 | Kikuchi |
| 2016/0261557 A1 | 9/2016 | Herrero et al. |
| 2016/0285735 A1 | 9/2016 | Chen et al. |
| 2016/0285846 A1 | 9/2016 | Abe |
| 2016/0294710 A1 | 10/2016 | Sreeramoju |
| 2016/0315853 A1 | 10/2016 | Liste et al. |
| 2016/0359673 A1 | 12/2016 | Gupta et al. |
| 2016/0360352 A1 | 12/2016 | Khan et al. |
| 2016/0371484 A1 | 12/2016 | Mehta et al. |
| 2016/0373304 A1 | 12/2016 | Sharma et al. |

(56) References Cited

U.S. PATENT DOCUMENTS

| | | |
|---|---|---|
| 2016/0378685 A1 | 12/2016 | Spurlock et al. |
| 2016/0378975 A1 | 12/2016 | Pikhur et al. |
| 2016/0379003 A1 | 12/2016 | Kapoor et al. |
| 2016/0381051 A1 | 12/2016 | Edwards et al. |
| 2017/0012956 A1 | 1/2017 | Lee et al. |
| 2017/0026349 A1 | 1/2017 | Smith et al. |
| 2017/0034052 A1 | 2/2017 | Chanda et al. |
| 2017/0041229 A1 | 2/2017 | Zheng |
| 2017/0063782 A1 | 3/2017 | Jain et al. |
| 2017/0063927 A1 | 3/2017 | Schultz et al. |
| 2017/0078184 A1 | 3/2017 | Tang et al. |
| 2017/0099160 A1 | 4/2017 | Mithyantha et al. |
| 2017/0104851 A1 | 4/2017 | Arangasamy et al. |
| 2017/0118228 A1 | 4/2017 | Cp et al. |
| 2017/0171055 A1 | 6/2017 | Wang et al. |
| 2017/0223063 A1 | 8/2017 | Herrero |
| 2017/0237760 A1 | 8/2017 | Holeman et al. |
| 2017/0264695 A1 | 9/2017 | Markovitz et al. |
| 2017/0317954 A1 | 11/2017 | Masurekar et al. |
| 2017/0339631 A1 | 11/2017 | Pugaczewski et al. |
| 2017/0346731 A1 | 11/2017 | Pukhraj Jain et al. |
| 2017/0353378 A1 | 12/2017 | Chen |
| 2017/0359247 A1 | 12/2017 | Dixon |
| 2017/0374025 A1 | 12/2017 | Pan |
| 2018/0013786 A1 | 1/2018 | Knopf |
| 2018/0018476 A1 | 1/2018 | Smith et al. |
| 2018/0026949 A1* | 1/2018 | Kimn .............. H04W 12/069 713/156 |
| 2018/0063077 A1 | 3/2018 | Tumuluru |
| 2018/0123827 A1 | 5/2018 | Josyula |
| 2018/0124183 A1 | 5/2018 | Kozat et al. |
| 2018/0139176 A1 | 5/2018 | Sato |
| 2018/0262487 A1 | 9/2018 | Zaifman et al. |
| 2018/0309786 A1 | 10/2018 | Apelewicz et al. |
| 2018/0324761 A1 | 11/2018 | Velev et al. |
| 2019/0005148 A1 | 1/2019 | Lam et al. |
| 2019/0014152 A1 | 1/2019 | Verma et al. |
| 2019/0021122 A1 | 1/2019 | Kawasaki et al. |
| 2019/0097805 A1 | 3/2019 | Shin et al. |
| 2019/0109822 A1 | 4/2019 | Clark et al. |
| 2019/0109848 A1 | 4/2019 | Clark et al. |
| 2019/0155752 A1 | 5/2019 | Spurlock et al. |
| 2019/0173736 A1 | 6/2019 | Ponnuswamy et al. |
| 2019/0173850 A1 | 6/2019 | Jain et al. |
| 2019/0173891 A1 | 6/2019 | Cp et al. |
| 2019/0190746 A1 | 6/2019 | Lee et al. |
| 2019/0205045 A1 | 7/2019 | Hugot et al. |
| 2019/0207747 A1 | 7/2019 | Durvasula et al. |
| 2019/0222559 A1 | 7/2019 | Wang et al. |
| 2019/0238592 A1 | 8/2019 | Qureshi et al. |
| 2019/0278908 A1 | 9/2019 | Mehta et al. |
| 2019/0306018 A1 | 10/2019 | Steverson et al. |
| 2019/0306035 A1 | 10/2019 | Scheib et al. |
| 2019/0312775 A1 | 10/2019 | Patil et al. |
| 2019/0313295 A1 | 10/2019 | Xu et al. |
| 2019/0349317 A1 | 11/2019 | Lu |
| 2019/0349369 A1 | 11/2019 | Bengtson et al. |
| 2019/0372948 A1 | 12/2019 | Varghese et al. |
| 2019/0394049 A1* | 12/2019 | Hartwig .............. H04L 63/0428 |
| 2020/0052928 A1 | 2/2020 | Lee et al. |
| 2020/0068049 A1 | 2/2020 | Ngo et al. |
| 2020/0076733 A1 | 3/2020 | Venkataraman |
| 2020/0076740 A1 | 3/2020 | Kim et al. |
| 2020/0112540 A1 | 4/2020 | Venkataraman |
| 2020/0119981 A1 | 4/2020 | Guthrie et al. |
| 2020/0162919 A1 | 5/2020 | Velev et al. |
| 2020/0177550 A1 | 6/2020 | Valluri et al. |
| 2020/0177606 A1 | 6/2020 | Valluri et al. |
| 2020/0213154 A1 | 7/2020 | Han et al. |
| 2020/0213280 A1 | 7/2020 | Guim Bernat et al. |
| 2020/0244625 A1 | 7/2020 | Tummalapenta et al. |
| 2020/0274851 A1 | 8/2020 | Qiao et al. |
| 2020/0287749 A1 | 9/2020 | Glazemakers et al. |
| 2020/0314179 A1 | 10/2020 | He et al. |
| 2020/0351254 A1 | 11/2020 | Xiong et al. |
| 2020/0389393 A1 | 12/2020 | Bosch et al. |
| 2021/0218777 A1 | 7/2021 | Chander et al. |
| 2021/0243163 A1 | 8/2021 | Miriyala et al. |
| 2021/0328830 A1 | 10/2021 | Kim et al. |
| 2021/0360083 A1 | 11/2021 | Duggal et al. |
| 2022/0104181 A1 | 3/2022 | Velev et al. |
| 2022/0109698 A1 | 4/2022 | Roh |
| 2022/0247720 A1 | 8/2022 | Kim |
| 2023/0247003 A1 | 8/2023 | Chanak et al. |

FOREIGN PATENT DOCUMENTS

| | | |
|---|---|---|
| CN | 107445011 A | 12/2017 |
| EP | 3254415 A1 | 12/2017 |
| JP | 2007243655 A | 9/2007 |
| JP | 2009163546 A | 7/2009 |
| JP | 2010011122 A | 1/2010 |
| JP | 2011015327 A | 1/2011 |
| JP | 2011166704 A | 8/2011 |
| JP | 5239341 B2 | 7/2013 |
| JP | 2015053069 A | 3/2015 |
| JP | 2016189127 A | 11/2016 |
| JP | 2017535843 A | 11/2017 |
| JP | 2017537501 A | 12/2017 |
| JP | 2018508140 A | 3/2018 |
| JP | 2018524843 A | 8/2018 |
| JP | 2019079504 A | 5/2019 |
| KR | 1020020088728 A | 11/2002 |
| KR | 1020030075810 A | 9/2003 |
| KR | 100692653 B1 | 3/2007 |
| KR | 1020070037650 A | 4/2007 |
| KR | 100748698 B1 | 8/2007 |
| KR | 1020070102698 A | 10/2007 |
| KR | 100856674 B1 | 8/2008 |
| KR | 1020100008740 A | 1/2010 |
| KR | 101020470 B1 | 2/2011 |
| KR | 1020120045859 A | 5/2012 |
| KR | 101173583 B1 | 8/2012 |
| KR | 1020130054919 A | 5/2013 |
| KR | 1020130076798 A | 7/2013 |
| KR | 1020140055857 A | 5/2014 |
| KR | 1020140074357 A | 6/2014 |
| KR | 101481337 B1 | 1/2015 |
| KR | 1020150013453 A | 2/2015 |
| KR | 1020150088494 A | 8/2015 |
| KR | 101561108 B1 | 10/2015 |
| KR | 101578193 B1 | 12/2015 |
| KR | 1020160029660 A | 3/2016 |
| KR | 1020160056118 A | 5/2016 |
| KR | 1020160123069 A | 10/2016 |
| KR | 1020170010835 A | 2/2017 |
| KR | 101743559 B1 | 6/2017 |
| KR | 1020170063795 A | 6/2017 |
| KR | 1020170132608 A | 12/2017 |
| KR | 1020180006413 A | 1/2018 |
| KR | 1020180019273 A | 2/2018 |
| KR | 1020180030023 A | 3/2018 |
| KR | 1020180032864 A | 4/2018 |
| KR | 101861201 B1 | 5/2018 |
| KR | 1020180062838 A | 6/2018 |
| KR | 1020180086964 A | 8/2018 |
| KR | 101910605 B1 | 10/2018 |
| KR | 1020180132868 A | 12/2018 |
| KR | 20190037088 A | 4/2019 |
| KR | 1020190036504 A | 4/2019 |
| KR | 1020190052541 A | 5/2019 |
| KR | 1020190073114 A | 6/2019 |
| KR | 102119257 B1 | 6/2020 |
| KR | 102146568 B1 | 8/2020 |
| WO | 2013170177 A1 | 11/2013 |
| WO | 2014062337 A1 | 4/2014 |
| WO | 2016057177 A1 | 4/2016 |
| WO | 2016190641 A1 | 12/2016 |
| WO | 2017016473 A1 | 2/2017 |
| WO | 2017081864 A1 | 5/2017 |
| WO | 2017126556 A1 | 7/2017 |

(56) References Cited

FOREIGN PATENT DOCUMENTS

WO  2018116123 A1  6/2018
WO  2021060856 A1  4/2021

OTHER PUBLICATIONS

Hassan, Suhaidi, et al.; Border Gateway Protocol based Path Vector mechanism for inter-domain routing in Software Defined Network environment; IEEE Conference on Open Systems (ICOS); Langkawi, Malaysia; Oct. 10, 2016; 5 Pages.

Glatz, Eduard, et al.; Classifying Internet One-way Traffic; Proceedings of the 12th ACM SIGMETRICS/Performance joint international conference on Measurement and Modeling of Computer Systems (SIGMETRICS 12); Association for Computing Machinery, New York, NY, USA; May 15, 2012; 29 Pages.

Bilger, Brent, et al.; Cloud Security Alliance (CSA); Software-Defined Perimeter Working Group (SDP) Specification 1.0; Apr. 2014; 28 Pages.

Garbis, Jason, et al.; Cloud Security Alliance (CSA); Software-Defined Perimeter Architecture Guide; Mar. 10, 2020; 43 Pages.

Waliyi, Adebayo Gbenga; Study and Implementation of Wireless Sensor Networks to Manage Energy in a Smart Home; African University of Science and Technology; AUST Institutional Repository; Abuja, Nigeria; Dec. 15, 2017; 69 Pages.

Kuta, Takayuki, et al.; Software Defined Perimeter (SDP) Usage Scenario Collection, Version 1.0; Japan Cloud Security Alliance, SDP Working Group; Apr. 25, 2019; 52 Pages.

Korean Office Action; Application No. 10-2020-0117543; Mailed: Nov. 13, 2020; 6 pages.

Korean Notice of Allowance; Application No. KR 10-2020-0105345; Dated: May 2, 2021.

Japanese Office Action; Application No. 2021-039780; Issued: Jun. 8, 2021; 13 Pages.

Extended European Search Report; Application No. 21162189.1; Completed: Jul. 7, 2021; Issued: Jul. 16, 2021; 44 Pages.

US Notice of Allowance; U.S. Appl. No. 16/580,974; Issued: Mar. 14, 2022; 8 Pages.

Japanese First Office Action; Application No. 2022-515499; 7 Pages.

Japanese Office Action; Application No. 2022002658; Issued: Mar. 3, 2022; 10 Pages.

International Search Report and Written Opinion of the International Searching Authority; Application No. PCT/KR2020/012927; Completed: Jan. 5, 2021; Mailing Date: Jan. 5, 2021; 10 Pages.

Extended European Search Report dated Oct. 28, 2022 for European Pat. App. No. 20868832.5.

Extended European Search Report dated Oct. 17, 2022 for European Pat. App. No. 20868932.3.

* cited by examiner

SYSTEM FOR REMOTE EXECUTION CODE-BASED NODE CONTROL FLOW MANAGEMENT, AND METHOD THEREFOR

CROSS-REFERENCE TO RELATED APPLICATIONS

The present application is the National Stage of International Application No. PCT/KR2020/012927, filed on Sep. 24, 2020, which claims priority from U.S. patent application Ser. No. 16/580,866, filed on Sep. 24, 2019, and Ser. No. 16/580,974, filed on Sep. 24, 2019. International Application No. PCT/KR2020/012927 claims priority to Korean Patent Application No. 10-2020-0098163, filed on Aug. 5, 2020. The present application is a continuation-in-part of U.S. patent application Ser. No. 16/580,974, filed on Sep. 24, 2019. All prior applications are herein incorporated by reference.

TECHNICAL FIELD

Embodiments disclosed in the present disclosure relate to technologies of generating and maintaining secure control flow for a remote execution code based node.

Background Art

The 4th industrial revolution, promoted by the fusion of information and communication technology (ICT) and traditional industries, is breaking down the technological boundaries between industries. Even traditional industrial companies without ICT-based business experience are under situations to respond to cybersecurity threats they have never experienced before.

Referring to FIG. 1, a conventional network is configured including a terminal 10 loaded with a communication application 20 including an execution module 21 and a communication module 22 and a server 30, communicatively connected with the terminal 10, for providing a specific service.

The conventional communication application 20 is distributed in a state where the communication module 22 for network access to the server 30 is distributed and establishes a single communication channel to be directly connected with the server 30.

To protect a communication interval with the server 30, a hyper text protocol secure (HTTPS), hyper text protocol over transaction layer security (HTTP over TLS), end to end security, or secure sockets layer-virtual private network (SSL-VPN) technology or the like is applied to the conventional communication application 20.

Because of including all communication applications and pieces of information upon initial distribution, the communication application having such distribution and communication structures has a problem which is difficult to correspond to threats due to various forgery/falsification, authentication bypass, and the like by reverse engineering (RE).

Particularly, because of having a structure of communicating over a single channel without separation of control flow and data flow, there is a problem in which it is difficult to perfectly block network access when network access is controlled or when a threat occurs.

Recently, malicious codes or malicious behaviors have disabled an existing network perimeter using the problem of the single communication channel and have generated a direct server attack.

An obfuscation technology for preventing reverse engineering of the communication application or a technology which dynamically downloads and executes a module, which is a representative example of a forgery and falsification detection and prevent technology, is introduced to protect the communication application. However, the corresponding technology is only a fragmented technology for protecting the application, and there is a problem in which it is difficult to effectively prevent reverse engineering.

Although the existing application in a real environment applies various security technologies, it does not provide a fundamental solution capable of blocking or filtering that a data packet is transmitted after bypassing a security module.

Particularly, because the bypass of the security technology of the application is increasingly sophisticated in attack and the security technology of the application will inevitably become disabled as a result over time, a fundamental alternative is required.

Disclosure

Technical Problem

An aspect of the present disclosure provides a system for managing control flow for a remote execution code based node and a method thereof.

Another aspect of the present disclosure provides a separation technology for generating secure control flow between a terminal application and a controller (or a server) in a zero trust environment to ensure secure authentication, authorization, or control system and providing a constant threat monitoring function for protecting control flow, a patch technology for disabling control flow tracking on a memory, and a separation technology for controlling such that it is not able to transmit a data packet any longer on the network by compulsorily ending data flow when the threat is discovered or when the control flow is ended.

Another aspect of the present disclosure provides an improved security technology for concentrating on protecting control flow to provide threat minimization by means of minimized attack surface management and providing an improved security technology capable of efficiently blocking communication by immediately removing data flow when discovering a control flow threat and controlling such that the application is not able to be used any longer.

Another aspect of the present disclosure provides a server for completing generation of control flow, when communicating control flow transmitted according to a control flow generation request and receiving the result of executing a remote execution code from the corresponding terminal and denying generation of control flow, when the executed result is not received within a predefined time or when the executed result value is different from an expected value.

The technical problems to be solved by the present disclosure are not limited to the aforementioned problems, and any other technical problems not mentioned herein will be clearly understood from the following description by those skilled in the art to which the present disclosure pertains.

Technical Solution

According to an aspect of the present disclosure, a method for managing control flow in a terminal may include transmitting a control flow generation request data packet to a server, receiving a control flow communication code from the server, loading and executing the received control flow communication code into a virtual machine, and transmitting the executed result to the server. The control flow may be generated, when the result of executing the control flow communication code is normal. The generation of the control flow may be blocked by the server, when the executed result value is abnormal or when the executed result is not received in the server within a certain time.

As an example, the method may further include transmitting a control flow communication code execution completion data packet indicating that the control flow communication code is normally executed to the server and receiving a control flow generation completion data packet indicating that the generation of the control flow is completed from the server. All requests of the terminal may be transmitted to the server based on the generated control flow using a virtualized application protocol interface (API).

As an example, the control flow communication code may be a byte code executable in the virtual machine, may not be stored in a separate disk, and may be directly loaded and executed in real time on a memory of the virtual machine.

As an example, the method may further include starting to poll control flow, when a status value included in the control flow generation completion data packet is normal, executing an inspection code, when there is the inspection code to be executed during the polling, and transmitting control flow polling information including the result of executing the inspection code to the server. A new patch code may be received from the server, when it is determined that the patch is needed by the server based on the result of executing the inspection code.

As an example, an existing control flow communication code may be deleted from a memory of the virtual machine depending on receiving the patch code. The control flow may be updated by means of execution of the patch code.

As an example, the method may further include receiving a polling information processing result data packet including information about the new inspection code, an entry point for executing the new inspection code, and the number of times of remaining execution of the new inspection code through the control flow, loading the new inspection code into a memory of the virtual machine, and adding information about the entry point and the number of times of the remaining execution to an inspection code execution queue. The new inspection code may be executed with reference to the inspection code execution queue at a next polling time.

As an example, the polling may be performed at a certain period according to a predetermined policy. The number of times of the remaining execution may decrease by 1, whenever the polling is performed. The new inspection code may be received from the server through the control flow and may be loaded and executed on the memory, when the number of times of the remaining execution is 0.

As an example, the method may further include transmitting a control flow end request data packet to the server, when corresponding to any one of when a status value of a received data packet is abnormal, when it fails to check validity of the received data packet, when a reason for end or stop occurs, when a threat is detected, when it fails to execute an inspection code, and when it fails to update the control flow. The corresponding control flow and all data flow associated with the corresponding control flow may be released according to the transmission of the control flow end request data packet.

As an example, the method may further include requesting the server to generate a tunnel using tunnel generation information, when the tunnel generation information is included in the control flow communication code. The tunnel generation information may include at least one of a tunnel type, a tunnel scheme, or authentication information for mutual key exchange.

According to another aspect of the present disclosure, a terminal for communicating with a server may include an execution module that transmits a control flow generation request data packet to the server, receives a control flow communication code from the server, and transmits the result of executing the control flow communication code to the server, a memory loaded with the received control flow communication code, and a virtual machine that executes the loaded control flow communication code on the memory. Control flow may be generated, when the result of executing the control flow communication code is normal. The generation of the control flow may be blocked by the server, when the executed result value is abnormal or when the executed result is not received in the server within a certain time.

As an example, the terminal may further include a means that transmits a control flow communication code execution completion data packet indicating that the control flow communication code is normally executed to the server and a means that receives a control flow generation completion data packet indicating that the generation of the control flow is completed from the server. All requests of the terminal may be transmitted to the server based on the generated control flow using a virtualized application protocol interface (API).

As an example, the control flow communication code may be a byte code executable in the virtual machine, may not be stored in a separate disk, and may be directly loaded and executed in real time on the memory of the virtual machine.

As an example, the terminal may further include a means that starts to poll control flow, when a status value included in the control flow generation completion data packet is normal, a means that executes an inspection code, when there is the inspection code to be executed during the polling, and a means that transmits control flow polling information including the result of executing the inspection code to the server. A new patch code may be received from the server, when it is determined that the patch is needed by the server based on the result of executing the inspection code.

As an example, an existing control flow communication code may be deleted from the memory of the virtual machine depending on receiving the patch code. The control flow may be updated by means of execution of the patch code.

As an example, the terminal may further include a means that receives a polling information processing result data packet including information about the new inspection code, an entry point for executing the new inspection code, and the number of times of remaining execution of the new inspection code through the control flow, a means that loads the new inspection code into the memory of the virtual machine, and a means that adds information about the entry point and the number of times of the remaining execution to an inspection code execution queue. The new inspection code may be executed with reference to the inspection code execution queue at a next polling time.

As an example, the polling may be performed at a certain period according to a predetermined policy. The number of times of the remaining execution may decrease by 1, whenever the polling is performed. The new inspection code may be received from the server through the control flow and is loaded and executed on the memory, when the number of times of the remaining execution is 0.

As an example, the terminal may further include a means that transmits a control flow end request data packet to the server, when corresponding to any one of when a status value of a received data packet is abnormal, when it fails to check validity of the received data packet, when a reason for end or stop occurs, when a threat is detected, when it fails to execute an inspection code, and when it fails to update the control flow. The corresponding control flow and all data flow associated with the corresponding control flow may be released according to the transmission of the control flow end request data packet.

As an example, the terminal may further include a means that requests the server to generate a tunnel using tunnel generation information, when the tunnel generation information is included in the control flow communication code. The tunnel generation information may include at least one of a tunnel type, a tunnel scheme, or authentication information for mutual key exchange.

According to another aspect of the present disclosure, a method for managing control flow in a server may include receiving a control flow generation request data packet from a terminal, transmitting a control flow communication code to the terminal, and receiving the result of executing the control flow communication code from the terminal. The control flow may be generated with terminal, when the result of executing the control flow communication code is normal. The generation of the control flow with the terminal may be blocked, when the executed result value is abnormal or when the executed result is not received from the terminal within a certain time.

According to another aspect of the present disclosure, a system for managing control flow may include a terminal that transmits a control flow generation request data packet to receive and execute a control flow communication code and transmits the result of executing the control flow communication code, a server that generates the control flow communication code corresponding to the terminal when receiving the control flow generation request data packet or extract the control flow communication code corresponding to the terminal, the control flow communication code being previously generated and maintained in a remote execution code table, transmits the control flow communication code to the terminal, generates the control flow with the terminal, when the result of the control flow communication code is normal, and blocks generation of the control flow with the terminal, when the executed result value is abnormal or when the executed result is not received within a certain time, and a gateway that generates data flow between the terminal and a destination network under control of the server.

The technical problems to be solved by the present disclosure are not limited to the aforementioned problems, and any other technical problems not mentioned herein will be clearly understood from the following description by those skilled in the art to which the present disclosure pertains.

Advantageous Effects

According to embodiments disclosed in the present disclosure, the present disclosure has an advantage which provides the system for managing the control flow for the remote execution code based node and the method thereof.

Furthermore, according to embodiments disclosed in the present disclosure, the present disclosure may have an advantage capable of generating secure control flow between an application and a controller in a zero trust environment to ensure secure authentication, authorization, or control system and providing a constant threat monitoring technology for protecting control flow, a patch technology for disabling control flow tracking on the memory, and a separation technology for controlling such that it is not able to transmit a data packet any longer on the network by compulsorily ending data flow when the threat is discovered or when the control flow is ended.

Furthermore, according to embodiments disclosed in the present disclosure, the present disclosure may have an advantage which concentrates on protecting control flow to provide threat minimization by means of minimized attack surface management and provides an improved security technology capable of efficiently blocking communication by immediately removing data flow when discovering a control flow threat and controlling such that the application is not able to be used any longer.

Furthermore, the present disclosure may have an advantage which provides a server which completes generation of control flow, when communicating control flow transmitted according to a control flow generation request and receiving the result of executing a remote execution code from the corresponding terminal and denies generation of control flow, when the executed result is not received within a predefined time or when the executed result value is different from an expected value.

In addition, various effects ascertained directly or indirectly through the present disclosure may be provided.

Figure 1:
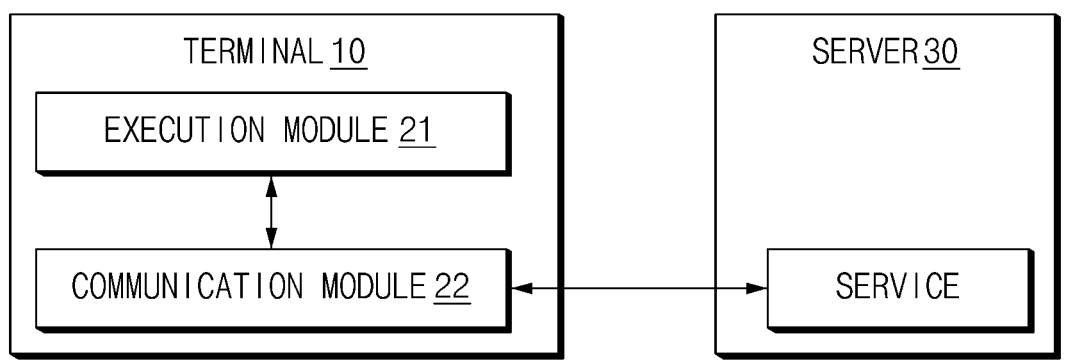
FIG. 1 is drawing illustrating a conventional general network structure.

With regard to description of drawings, the same or similar denotations may be used for the same or similar components.

MODE FOR INVENTION

Hereinafter, various embodiments of the disclosure will be described with reference to accompanying drawings. However, it should be understood that this is not intended to limit the present disclosure to specific implementation forms and includes various modifications, equivalents, and/or alternatives of embodiments of the present disclosure.

A singular form of a noun corresponding to an item in the present disclosure may include one or plural of the items, unless the relevant context clearly indicates otherwise. In the present disclosure, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. Such terms as "1st" and "2nd," or "first" and "second" may be used to simply distinguish a corresponding component from another, and does not limit the components in other aspect (e.g., importance or order). It is to be understood that if any (e.g., a first) component is referred to, with or without the term "operatively" or "communicatively", as "coupled with," "coupled to," "connected with," or "connected to" another (e.g., a second) component, it means that the element may be coupled with the other element directly (e.g., wiredly), wirelessly, or via a third component.

Each (e.g., a module or a program) of components described in the present disclosure may include singular or plural entities. According to various embodiments, one or more of corresponding components or operations may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As used in the present disclosure, the term "module" may include a unit implemented in hardware, software, or firmware, and may interchangeably be used with other terms, for example, "logic," "logic block," "part," or "circuitry". A module may be an integral part, or a minimum unit or portion thereof, adapted to perform one or more functions. For example, according to an embodiment, the module may be implemented in the form of an application-specific integrated circuit (ASIC).

Various embodiments of the present disclosure may be implemented as software (e.g., a program or an application) including instructions that are stored in a machine-readable storage medium (e.g., a memory). For example, a processor of the machine may invoke at least one of the stored one or more instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device and does not include a signal (e.g., an electromagnetic wave), but this term does not differentiate between where data is semipermanently stored in the storage medium and where data is temporarily stored in the storage medium.

A method according to various embodiments disclosed in the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least a part of the computer program product may be temporarily generated or at least temporarily stored in the machine-readable storage medium, such as a memory of the manufacturer's server, a server of the application store, or a relay server.

Hereinafter, a description will be given in detail of a system for managing control flow for a remote execution code based node and a method thereof according to an embodiment of the present disclosure with reference to FIGS. 2 to 16.

Figure 2:
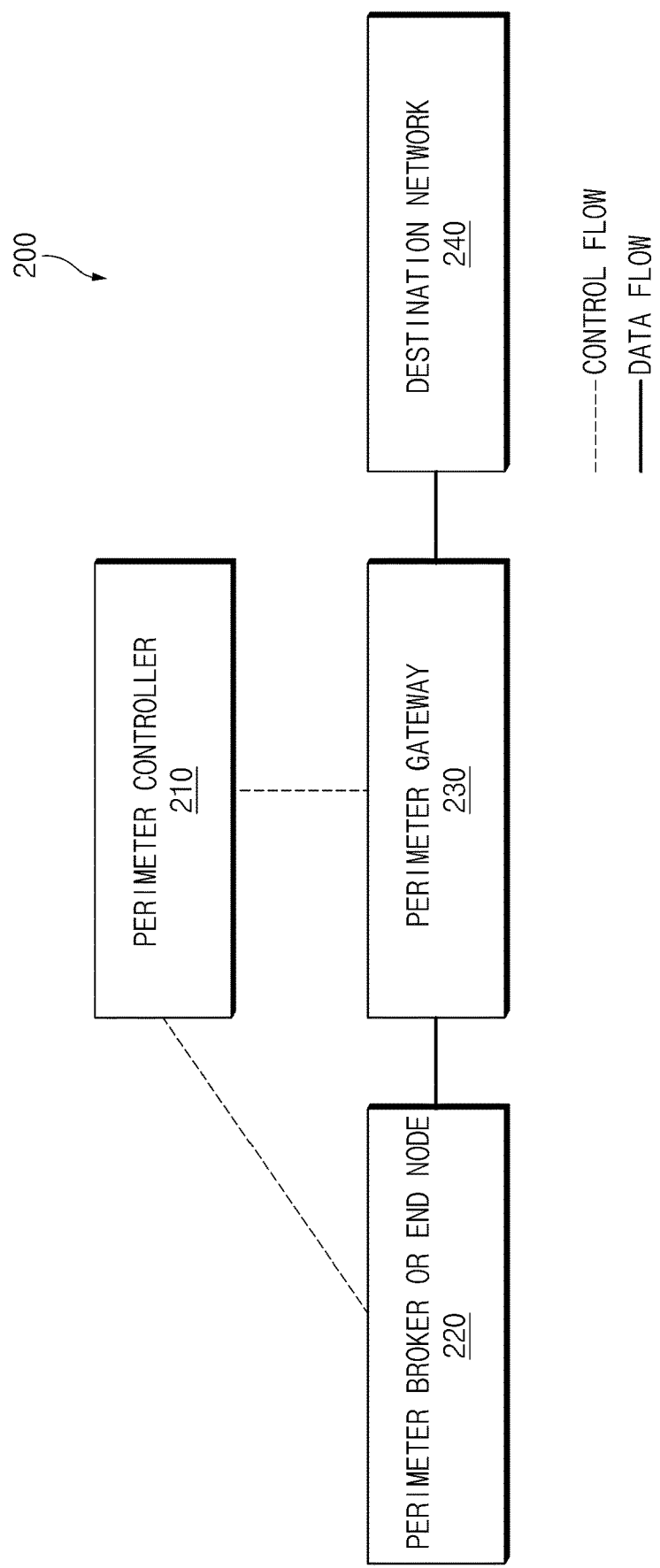
FIG. 2 is a perimeter network (or control flow management system) structure according to an embodiment of the present disclosure.

FIG. 2 is a perimeter network (or control flow management system) structure according to an embodiment of the present disclosure.

Referring to FIG. 2, a perimeter network 200 (or a system for managing control flow) may be configured including a perimeter controller 210, a perimeter broker or end node 220, a perimeter gateway 230, and a destination network 240.

Herein, the perimeter controller 210 may play a role as a server. The perimeter broker 220 may be a network access control application capable of being loaded into a terminal, generating control flow between the terminal and the perimeter controller 210 under control of the perimeter controller 210, and transmitting or receiving a control data packet through the generated control flow. For example, the network access control application may perform user authentication, a network access procedure requesting to access a destination network, or another control procedure with the perimeter controller 210.

As an example, the perimeter broker 220 may request the perimeter controller 210 to generate control flow to receive and load a control flow communication and remote execution code from the perimeter controller 210 and may execute the loaded code to transmit the executed result to the perimeter controller 210. The perimeter controller 210 may complete generation of control flow, when the executed result is normal, and may deny (or block) the generation of the control flow, when the executed result is not received within a predefined time or when the executed result value is different from an expected result.

As an embodiment, after control flow between the perimeter broker 220 of the terminal and the perimeter controller 210 which is a server is normally generated, the perimeter controller 210 may update control flow at a certain period. When it fails to update the control flow (i.e., when the executed result for updating the control flow is not received within a certain time from the terminal) and when the executed result value for updating the control flow is different from the expected value, the perimeter controller 210 may remove control flow and data flow set with the corresponding terminal to block network access of the corresponding terminal.

As another embodiment, when additional inspection for the terminal is needed, the perimeter controller 210 may initiate a control flow update procedure irrespective of an update period. The perimeter controller 210 may generate and transmit a new remote execution code to the terminal when additional inspection is needed. When the result of executing a corresponding code is not received within a certain time or when the executed result value is abnormal, the perimeter controller 210 may remove control flow and data flow set in the corresponding terminal to block network access of the corresponding terminal. The perimeter controller 210 may control various components between the terminal and the terminal.

As an example, a component controlled by the perimeter controller 210 may include all devices on a network, for example, an application which is present in the destination network 240 when implementing a peer 2 peer communication network, a terminal loaded with the corresponding application, or the like, as well as the perimeter broker 220 and the perimeter gateway 230.

The perimeter broker 220 may be a component loaded with a communication application which receives a data packet of the terminal for the first time. The perimeter broker 220 may be a component embedded in the terminal, but this is merely an embodiment. The perimeter broker 220 may be separate equipment loaded with a communication modem and a communication application capable of communicating with the terminal in a wired or wireless manner.

The perimeter gateway 230 may be a component loaded with a communication application for performing control such that only an authorized or granted data packet may be forwarded and(or) routed in a network perimeter.

Figure 3A:
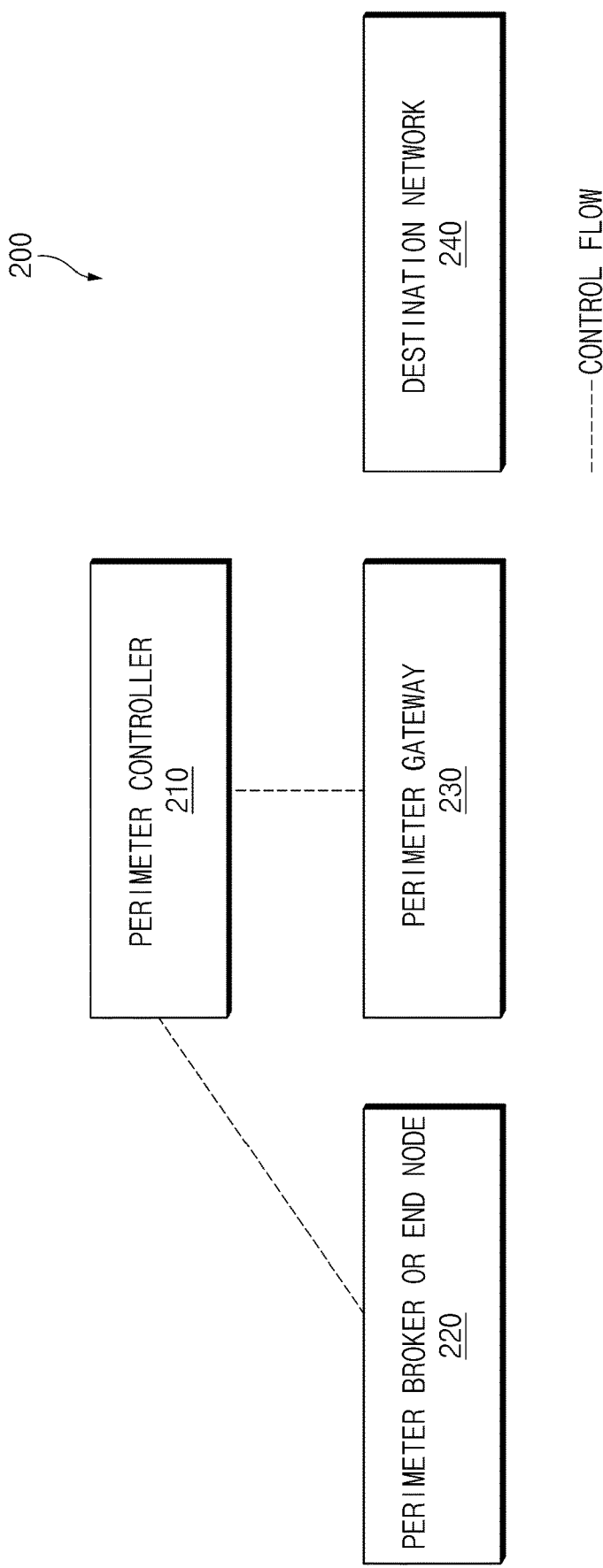
FIGS. 3A and 3B are drawings illustrating a general network topology.
Figure 3B:
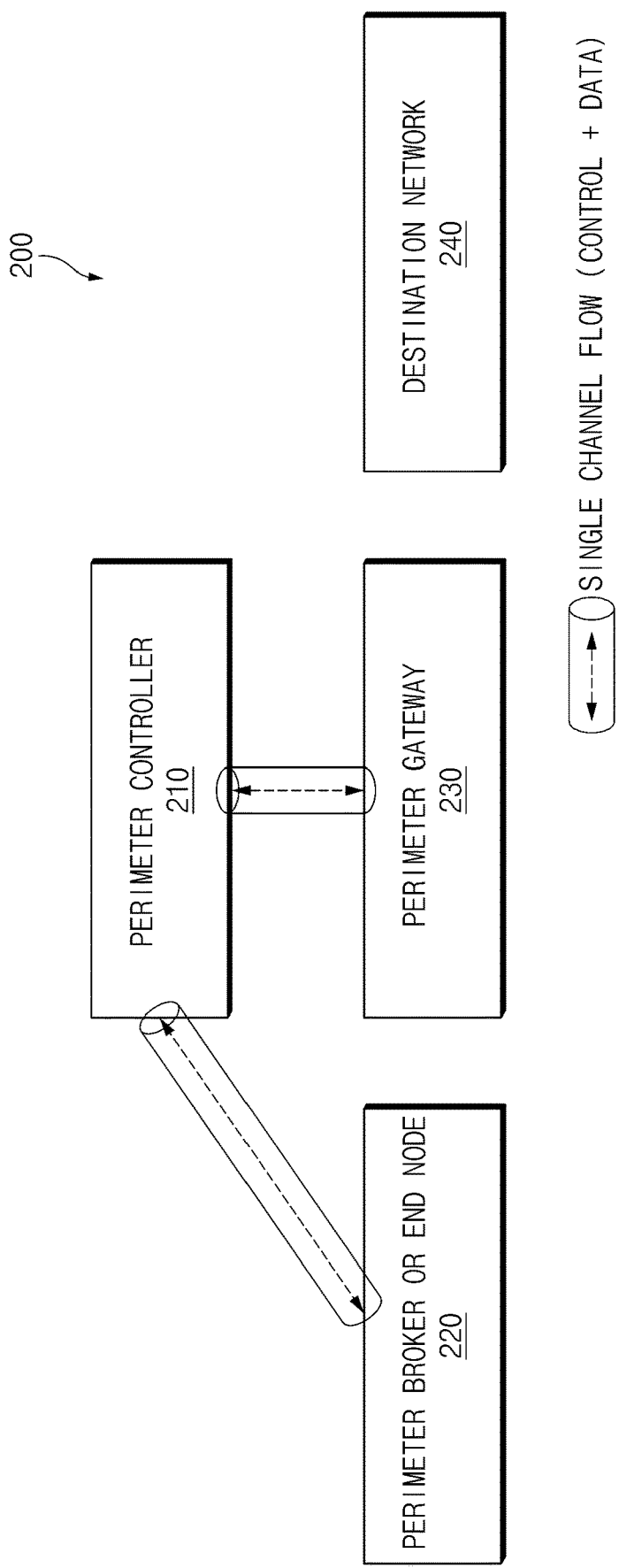

FIGS. 3A and 3B are drawings illustrating a general network topology.

For the general network topology, control flow with respect to a component which should be controlled by the perimeter controller 210 should be established in a data flow structure by means of an Internet protocol (IP) technology between the terminal, the network perimeter, and an access target network.

Referring to FIG. 3A, control flow may be established between a perimeter controller 210 and a perimeter broker 220 and between the perimeter controller 210 and a perimeter gateway 230.

Actually, as shown in FIG. 3A, a perimeter network 200 may start in a state where only control flow is composed and where data flow for accessing a target network—for example, a destination network 240—is not established.

Components may be physically connected to a network when the data flow is not established, but, because there is no tunnel capable of accessing the target network, a data packet may not be delivered to the target network.

Basically, although the topology provides a structure where the terminal is controlled by the control flow to provide a relatively secure element from various threats, as control data and general data are used interchangeably over a single channel as shown in FIG. 3B, there is a problem in which it is still difficult to ensure safety of control flow in a zero trust environment.

Figure 3C:
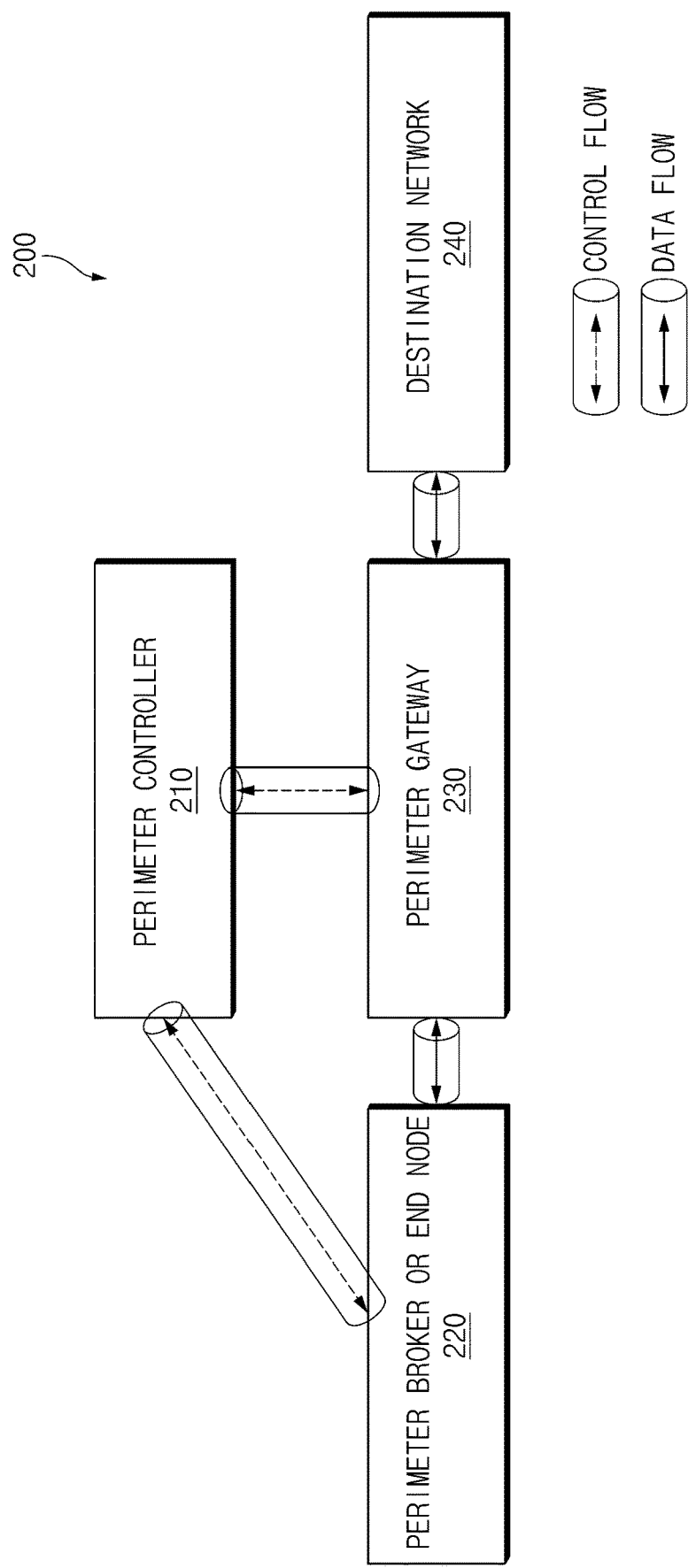
FIGS. 3C and 3D are drawings illustrating a network topology according to an embodiment.
Figure 3D:
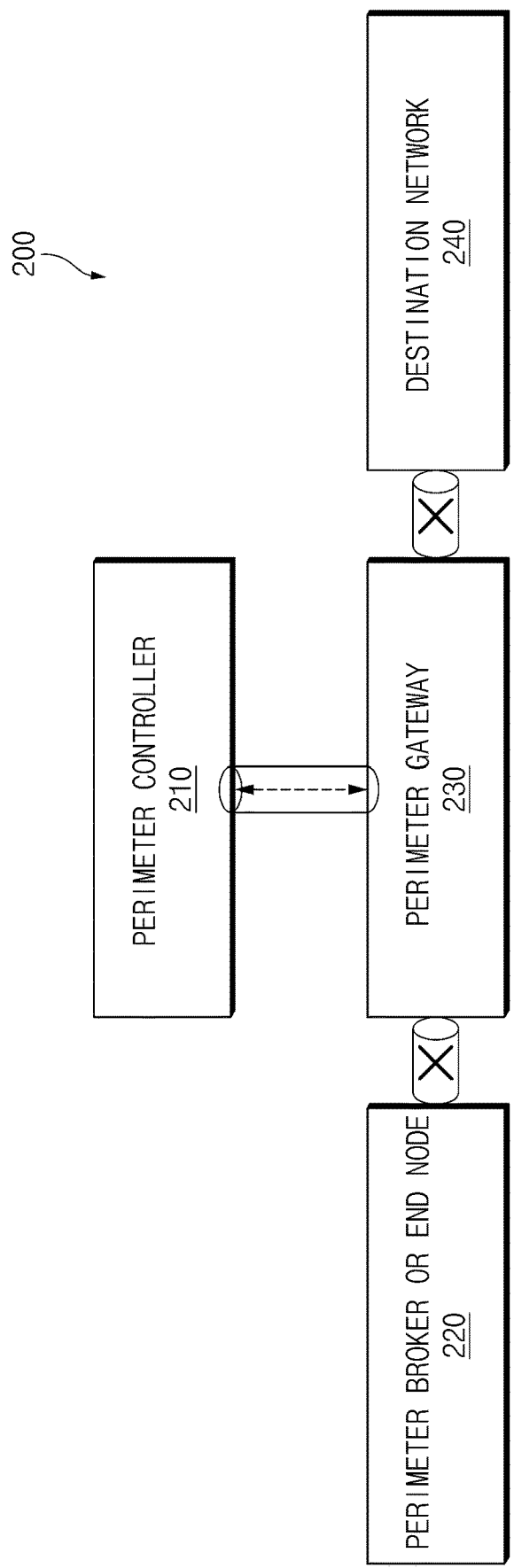

FIGS. 3C and 3D are drawings illustrating a network topology according to an embodiment.

The network topology according to an embodiment may provide a method capable of communicating based on secure control flow by applying a tunneling technology or an internal protection technology to protect a communication interval between a perimeter broker 220 (or a terminal) and a perimeter controller 210 and between the perimeter controller 210 and a perimeter gateway 230.

Referring to FIG. 3C, the network topology according to an embodiment may generate data flow independently of control flow.

The control flow may be established between the perimeter controller 210 and the perimeter broker 220 and between the perimeter controller 210 and the perimeter gateway 230.

The data flow may be established between the perimeter broker 220 and the perimeter gateway 230 and between the perimeter gateway 230 and a destination network 240.

The perimeter broker 220 (or the terminal) on the network topology according to the present embodiment may perform various authorization and authentication requests for communication with the destination network 240 based on secure control flow. The perimeter controller 210 may transmit an inspection code for detecting various threats of each terminal which is in a zero trust state to the perimeter broker 220 (or the terminal) and may identify the remote execution result to detect whether there is a threat.

Furthermore, the perimeter broker 220 (or the terminal) on the network topology according to the present embodiment may execute a patch code for providing a control flow environment which continuously changes, for example, a continuous change in memory location and code, a change in interval encryption information or tunneling information, or the like to prevent forgery or falsification and bypass of a code in which control flow is established and may effectively protect the control flow by means of it.

The perimeter broker 220 (or the terminal) may be loaded with a connectivity control technology capable of ensuring secure communication between the perimeter broker 220 (or the terminal) and a target network and performing communication for only an authorized target by performing an authorization and authentication request for communication with the target network based on secure control flow to generate data flow.

Referring to FIG. 3D, when various threats are detected through a continuous threat detection procedure or when a communication end request is normally received from the perimeter broker 220 (or the terminal), as the perimeter controller 210 collects the generated control flow and collects all of data flow corresponding to the collected control flow, the perimeter broker 220 (or the terminal) may change to a state incapable of transmitting a data packet to the destination network 240.

Figure 4:
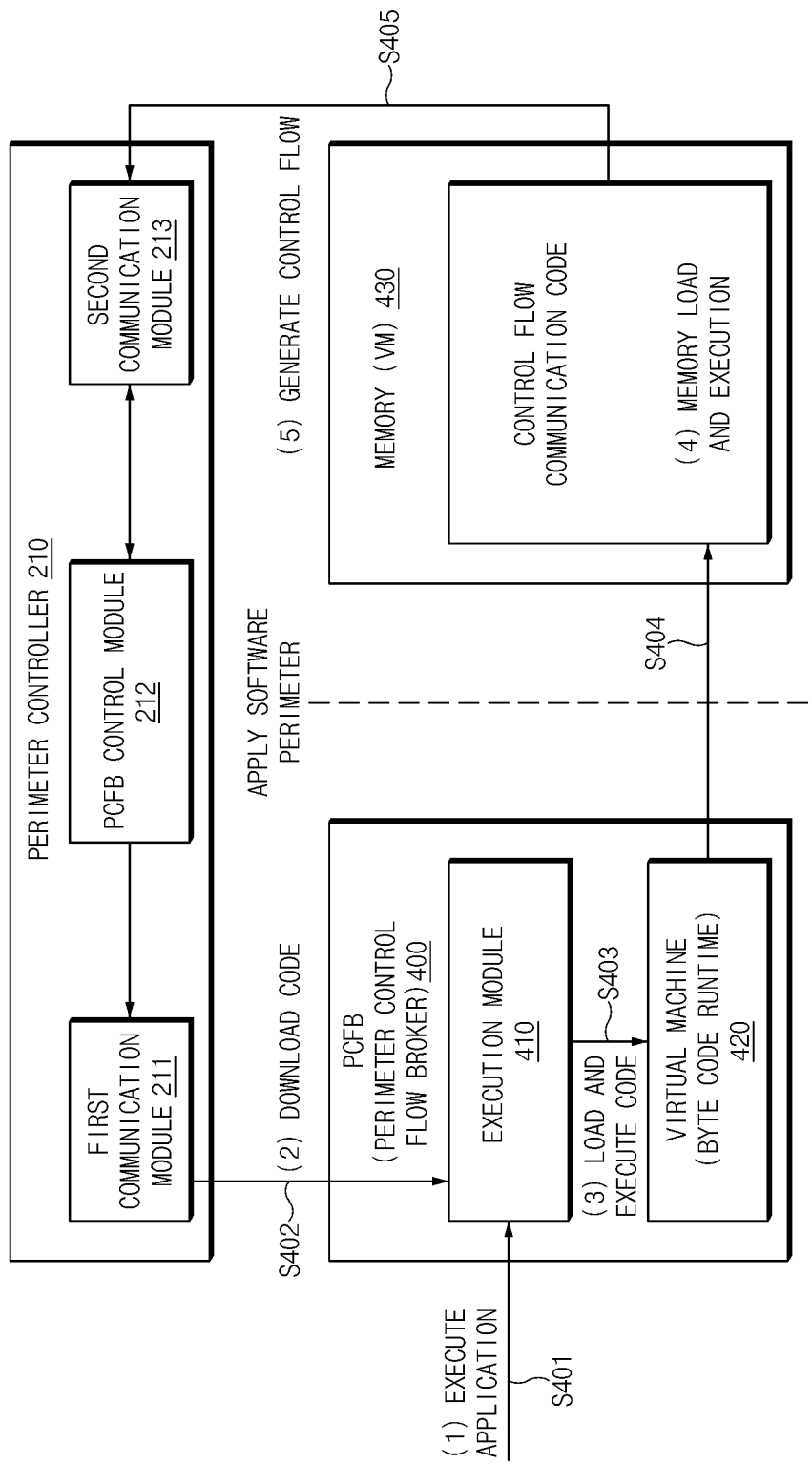
FIG. 4 is a drawing illustrating an operation of a perimeter control flow broker according to an embodiment of the present disclosure.

FIG. 4 is a drawing illustrating an operation of a perimeter control flow broker according to an embodiment of the present disclosure.

Referring to FIGS. 2 and 4, a perimeter control flow broker (PCFB) 400 may be inserted into an application for performing communication with a perimeter controller 210 in a component such as a perimeter broker 220 or a perimeter gateway 230 or may be implemented as an application which operates in the form of a network driver or independently.

The PCFB 400 may be used for the purpose of generating secure control flow between each component and the perimeter controller 210, transmitting various network access control requests generated by each component to the perimeter controller 210, receiving a remote execution code transmitted by the perimeter controller 210, and securely transmitting the executed result.

Herein, generating the control flow refers to generating a path capable of transmitting and receiving a data packet for control, which is capable of performing reliability and verification therebetween based on a session the perimeter broker 220 and the perimeter controller 210. Information for establishing a tunnel may be provided if necessary in the process of generating control flow to ensure secure communication therebetween.

Referring to FIG. 4, the perimeter controller 210 may be configured including a first communication module 211 for general communication, a PCFB control module 212 for controlling an operation of the PCFB, and a second communication module 213 for performing communication for generating control flow.

The PCFB 400 may be configured including an execution module 410 and a virtual machine 420.

When an application is run for the first time (S401), the execution module 410 of the PCFB 400 may download a control flow communication code from the perimeter controller 210 (S402) and may control the virtual machine 420 to perform code loading and execution (S403).

When the control flow communication code is loaded into a memory 430 and is then executed (S404), the virtual machine 420 may generate dedicated control flow for communicating with the perimeter controller 210 (S405).

Because the control flow communication code according to an embodiment operates at the level of the memory 430 of the virtual machine 420, the present disclosure has an advantage capable of rendering reverse engineering for the PCFB 400 difficult in a state where the terminal and a network environment are basically unreliable and rendering various threats and bypass more difficult than a conventional application which operates by including a perfect module.

Furthermore, the control flow communication code may be a series of byte codes for operating in a virtual machine embedded in the perimeter broker 220 or a virtual machine provided from an operating system (OS), which may be a code executable by a runtime such as Java, or .NET (MSIL) or a voluntarily developed virtual machine.

Because the control flow communication code is controlled to be directly inserted and executed on the memory of the virtual machine rather than directly storing the code in a separate disk in the runtime, it has an advantage capable of running without a trace and has a feature capable of making an attack only when it should be able to analyze the memory. Thus, the present disclosure has an advantage capable of providing a more improved reverse engineering prevention method than an existing scheme transmitted in the form of a dynamic link library (DLL) patch and a module.

Figure 5:
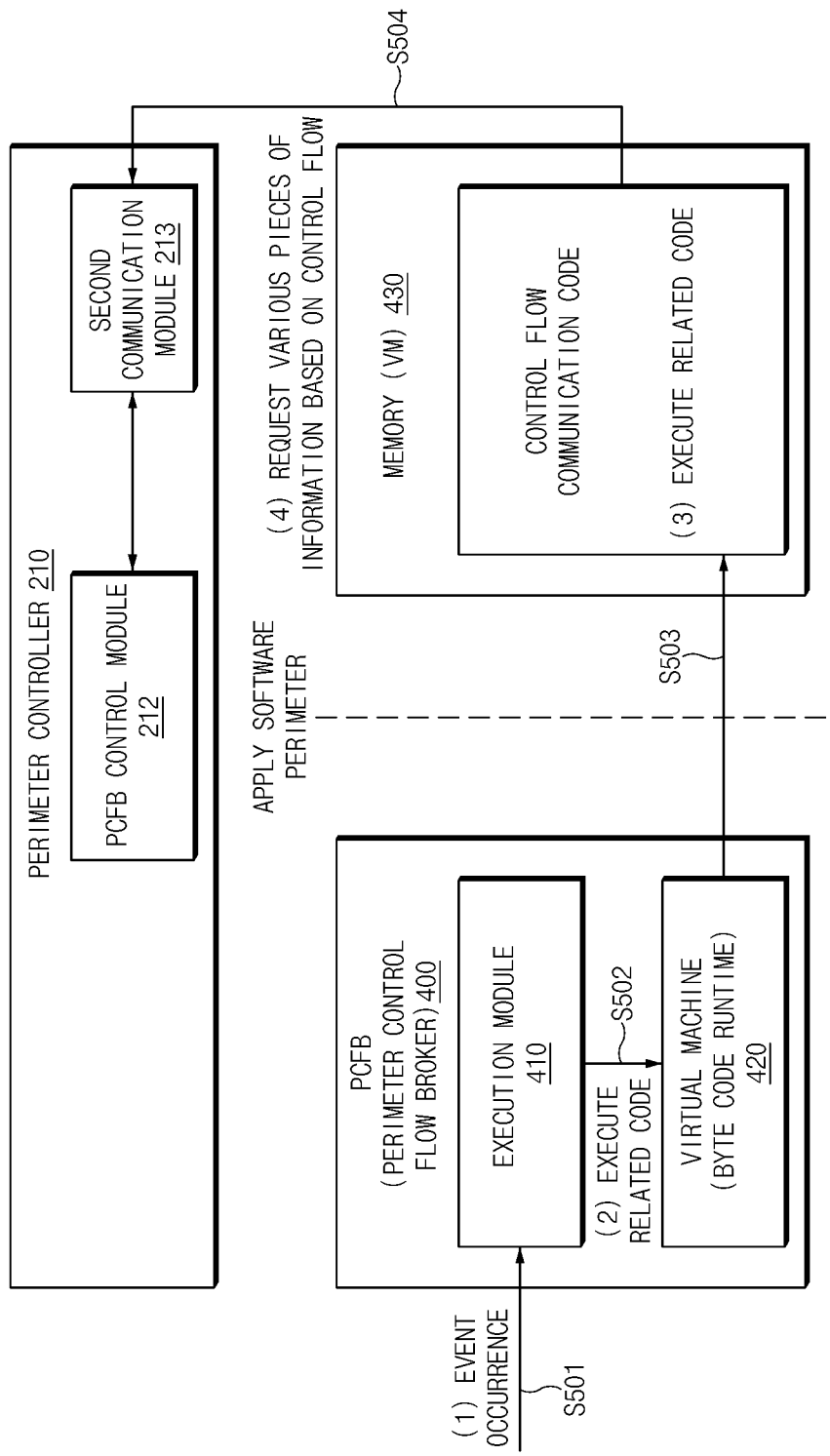
FIG. 5 is a drawing illustrating an operation of a perimeter control flow broker according to another embodiment of the present disclosure.

FIG. 5 is a drawing illustrating an operation of a perimeter control flow broker according to another embodiment of the present disclosure.

In detail, FIG. 5 is a drawing illustrating an event processing procedure based on control flow in a PCFB 400.

Referring to FIGS. 5, a perimeter control flow broker (PCFB) 400 may be inserted into an application for performing communication with a perimeter controller 210 in a component such as a perimeter broker 220 or a perimeter gateway 230 or may be implemented as an application which operates in the form of a network driver or independently.

The PCFB 400 may be used for the purpose of generating secure control flow between each component and the perimeter controller 210, transmitting various network access control requests generated by each component to the perimeter controller 210, receiving a remote execution code transmitted by the perimeter controller 210, and securely transmitting the executed result.

Herein, generating the control flow refers to generating a path capable of transmitting and receiving a data packet for control, which is capable of performing reliability and verification therebetween based on a session the perimeter broker 220 and the perimeter controller 210. Information for establishing a tunnel may be provided if necessary in the process of generating control flow to ensure secure communication therebetween.

Referring to FIG. 4, the perimeter controller 210 may be configured including a first communication module 211 for general communication, a PCFB control module 212 for controlling an operation of the PCFB, and a second communication module 213 for performing communication for generating control flow.

The PCFB 400 may be configured including an execution module 410 and a virtual machine 420.

When an application is run for the first time (S401), the execution module 410 of the PCFB 400 may download a control flow communication code from the perimeter controller 210 (S402) and may control the virtual machine 420 to perform code loading and execution (S403).

When the control flow communication code is loaded into a memory 430 and is then executed (S404), the virtual machine 420 may generate dedicated control flow for communicating with the perimeter controller 210 (S405).

Because the control flow communication code according to an embodiment operates on the memory 430 of the virtual machine 420, the present disclosure has an advantage capable of rendering reverse engineering for the PCFB 400 difficult in a state where a terminal and a network environment are basically unreliable and rendering various threats and bypass more difficult than a conventional application which operates by including a perfect module.

Furthermore, the control flow communication code may be a series of byte codes for operating in a virtual machine embedded in the perimeter broker 220 or a virtual machine provided from an operating system (OS), which may be a code executable by a runtime such as Java, or .NET (MSIL) or a voluntarily developed virtual machine.

Because the control flow communication code is controlled to be directly inserted and executed on the memory of the virtual machine rather than directly storing the code in a separate disk in the runtime, it has an advantage capable of running without a trace and has a feature capable of making an attack only when it should be able to analyze the memory. Thus, the present disclosure has an advantage capable of providing a more improved reverse engineering prevention method than an existing scheme transmitted in the form of a dynamic link library (DLL) patch and a module.

The perimeter controller 210 according to an embodiment may randomly generate an inspection code which is difficult to be tracked and inferred at a necessary time by a policy. The generated inspection code should be able to be remotely transmitted through enabled control flow.

The PCFB 400 may receive and execute an inspection code by means of a control flow communication code executed at the level of the memory 430 of the virtual machine 420. The result of executing the inspection code may be securely transmitted to the perimeter controller 210 through the enabled control flow.

The perimeter controller 210 may determine to remove or determine control flow based on the result of executing the inspection code.

Figure 6:
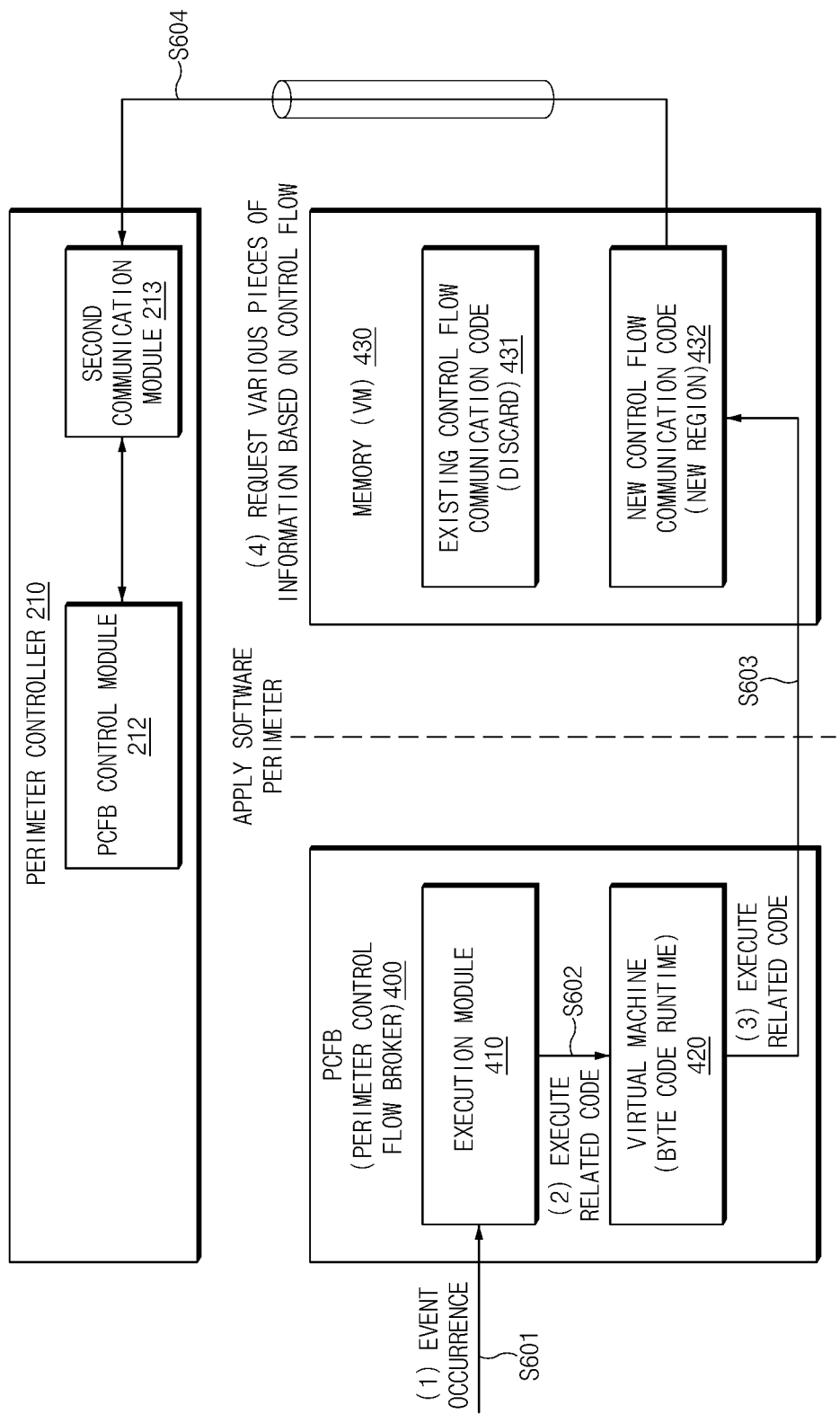
FIG. 6 is a diagram illustrating a control flow communication code update operation according to an embodiment of the present disclosure.

FIG. 6 is a diagram illustrating a control flow communication code update operation according to an embodiment of the present disclosure.

Unlike providing a series of codes for detecting various threat elements, such as detecting and preventing application forgery/falsification capable of being generated in a conventional untrusted zero trust environment or detecting a harmful environment, or rendering hacking difficult together with distribution of an application, a perimeter controller 210 according to the present disclosure may randomly generate and remotely transmit a corresponding inspection code to the PCFB 400 through secure control flow such that a code for continuously detecting a necessary threat at a necessary time by a policy may be inferred by a hacker or the like.

Referring to FIG. 6, when occurrence of a certain event is detected by an execution module 410 (S610), an inspection code transmitted to a PCFB 400 may be executed on a memory 430 of a virtual machine 420 (S602 and S603), and the result of executing the related code may be transmitted to the perimeter controller 210 through secure control flow. At this time, the perimeter controller 210 may determine whether to remove control flow and related data flow based on the received executed result value to determine whether to authorize a corresponding component to continuously perform communication.

The perimeter controller 210 may reform (and patch) a control flow communication code during a certain time or depending on occurrence of a specific event to block a region of the memory 430 of the PFCB 400 from being analyzed by a stealer.

A new control flow communication code may be transmitted based on secure control flow upon patching to be executed at the level of the memory 430 of the virtual machine 420. At this time, an existing control flow communication code 431 may be discarded from the memory 430, and a new control flow communication code 432 may be recorded and executed on a new region of the memory 430.

As described above, as the control flow communication code is updated (and patched) at a certain period and (or) based on a specific event, a series of pieces of information arranged on the memory 430 may be changed. There is an advantage in which this may effectively prevent reverse engineering and various threat behaviors of the stealer.

Figure 7:
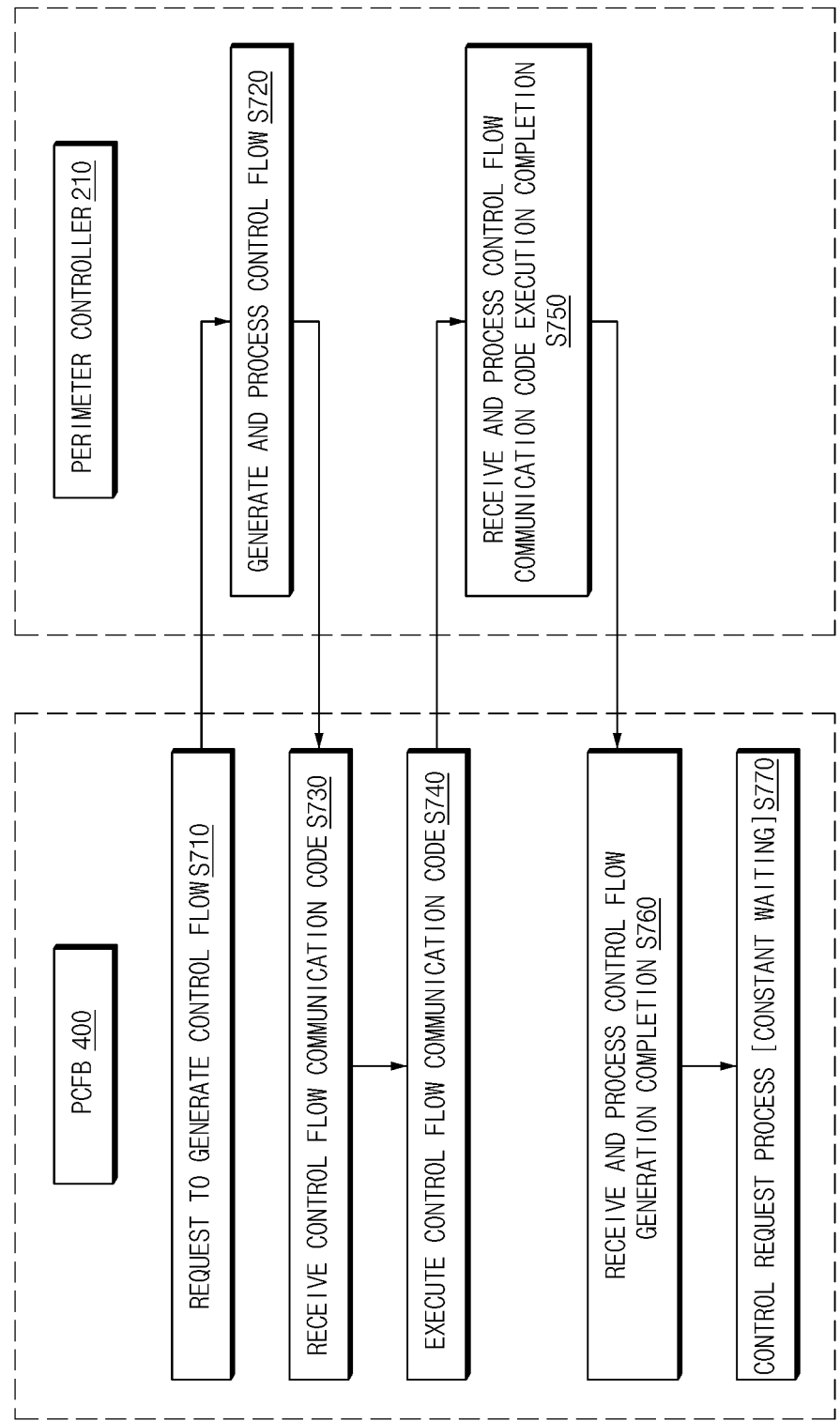
FIG. 7 is a drawing illustrating a control flow generation procedure between a PCFB and a perimeter controller according to an embodiment of the present disclosure.

FIG. 7 is a drawing illustrating a control flow generation procedure between a PCFB and a perimeter controller according to an embodiment of the present disclosure.

Referring to FIG. 7, the control flow generation procedure may be configured including requesting (S710) to generate control flow, generating and processing (S720) the control flow, receiving (S730) a control flow communication code, executing (S740) the control flow communication code, receiving and processing (S750) control flow communication code execution completion, receiving and processing (S760) control flow generation completion, and a control request process (S770).

Hereinafter, a description will be given in detail of each step of the control flow generation procedure.

1) Requesting (S710) to Generate the Control Flow

A PCFB 400 may request information for generating control flow for transmitting/receiving secure control data between a perimeter controller 210 and the PCFB 400 from the perimeter controller 210 using a known protocol (a TCP, an HTTP, an HTTPS, or the like).

As an example, to request to generate the control flow, a value transmitted to the perimeter controller 210 by the PCFB 400 may include an ID and data.

Herein, the ID may be information for identifying the PCFB 400 or a communication application including the PCFB 400, which may include an application ID, a hash value, a fingerprint, a signature value, or the like.

As an example, a data packet for requesting to generate the control flow before being encrypted and encapsulated may be configured as follows.

{id: WxUV9xzbZT9YQjkn, data: {deviceid: MdfSYAbmkWcK8pa5}}

An additional protection technology, such as a transmission process of a communication interval protection process, may be applied for improving a problem capable of being generated in an existing protocol when a data packet is transmitted and for improved communication protection.

2) Generating and Processing (S720) the Control Flow

The perimeter controller 210 may receive a data packet for requesting to generate the control flow from the PCFB 400.

The perimeter controller 210 may obtain pieces of information about an application and the PCFB 400 from a previously stored application distribution table based on an ID included in the received data packet.

When the pieces of information about the application and the PCFB 400 are not present in the application distribution table—that is, when the corresponding application and the corresponding PCFB 400 are present, but are unavailable, the perimeter controller 210 may deny the request to generate the control flow.

When a protection technology for a data packet is applied, the perimeter controller 210 may perform a reception process of the communication interval protection process which will be described below. When it fails to receive and process it, the perimeter controller 210 may deny the request to generate the control flow.

When various pieces of identification information included in the transmitted IP or data are included in a blacklist, the perimeter controller 210 according to an embodiment may deny the request to generate the control flow.

The perimeter controller 210 may generate a control flow communication code executed in a virtual machine 420 or may prepare for a previously generated code to generate control flow with the PCFB 400.

The control flow communication code may include continuous polling for generating control flow and maintaining the control flow, a series of systems where the perimeter controller 210 executes a remote code, a stub where a communication application requests various control from the PCFB 400, entry information for being executed for the first time, or the like.

A request of the communication application and all control related communication requested to the perimeter controller 210 by the PCFB 400 may be securely protected by means of a control flow communication code. Various attacks by reverse engineering of an application may be minimized according to a characteristic in which the control flow communication code is run on the virtual machine 420.

In the generation of the control flow, a tunnel may be established between the PCFB 400 and the perimeter controller 210 in a transport layer by means of a known tunneling scheme (IPSec or the like) or a tunnel may be established by means of an internal tunneling algorithm, with regard to an environment of the terminal—for example, an environment where two or more of IPSec tunneling are not established, for mobile, or the like-. At this time, an included code may vary with each environment.

For example, when the known tunneling scheme is used, a series of pieces of authentication information necessary to generate a tunnel, for example, a preshared key or authentication information, may be used. When an internal tunneling scheme is used, tunneling at a data packet level where a characteristic for confidentiality, integrity, or the like a known tunneling algorithm has is considered may be provided.

The control flow generation code may include a control flow ID and may be implemented such that the terminal may be identified by means of the control flow ID upon communication by control flow.

The control flow ID included in the generated control flow communication code may be added to a control flow table. Herein, the control flow table may be a kind of session management table, and a control flow generation expiration time set by a series of information policies to be verified when communicating based on the corresponding control flow ID may be registered with the control flow table.

Thereafter, the perimeter controller 210 may transmit the generated or prepared control flow communication code to the PCFB 400.

The perimeter controller 210 may transmit status information which is a response code (normal (0) or abnormal (1)) for the request to generate the control flow and entry point information for executing the control flow communication code together with the control flow communication code to the PCFB 400.

The perimeter controller 210 may apply an additional protection technology, such as the transmission process of the communication interval protection process to be described below for improving a problem capable of being generated in an existing protocol when a data packet including the control flow communication code is transmitted and for improved communication protection.

When the request to generate the control flow is denied through the above-mentioned process, information including a reason and time for denying the request and information (a terminal ID, an IP, or the like) identified up to a corresponding time point to a preliminary blacklist.

When the denial of the request occurs above a certain number of times during a certain time by a blacklist policy, as the denial may be converted and added to the blacklist based on the identified information, an item requested thereafter through a corresponding terminal ID or IP may be basically denied by the perimeter controller 210.

As an embodiment, the blacklist may be automatically removed after a certain time according to a policy and may be removed by a manager.

3) Receiving (S730) the Control Flow Communication Code

The PCFB 400 may receive a data packet including the control flow communication code from the perimeter controller 210.

The PCFB 400 may perform the reception process of the communication interval protection process, when a protection technology for a data packet is applied, and may stop generating the control flow, when it fails to receive and process it.

4) Executing (S740) the Control Flow Communication Code

The PCFB 400 may extract the control flow communication code from the received data packet and may inject the control flow communication code into the virtual machine 420.

Herein, the injection may be direct code injection, but this is merely an embodiment. When the capacity of the control flow communication code is large, the control flow communication code may be stored and injected in the form of a file.

When the injection is completed, the PCFB 400 may execute the injected control flow communication code using entry point information included in the data packet.

When the execution of the control flow communication code is completed, all pieces of information and files used to perform communication up to now may be removed from the memory 430, and all subsequent procedures may be implemented using a newly injected control flow communication code.

When information for generating a tunnel when the control flow communication code is executed is included, the PCFB 400 may request the perimeter controller 210 to generate the tunnel using the corresponding tunnel generation information.

Herein, the tunnel generation information may include a tunnel type (e.g., IPSec or the like) necessary to generate a tunnel, a tunneling scheme (e.g., an AH mode, an ESP mode, or the like), authentication information (e.g., a preshared key, a user ID, a password, or the like) for mutual key exchange, or the like, and an optimized tunnel technology may be applied according to an environment of the terminal.

Furthermore, a data packet may be securely protected in a transmission interval through the generated tunnel.

When it fails to generate the tunnel, the control flow generation procedure may be ended.

The PCFB 400 may execute a series of codes included in the control flow communication code and may transmit a control flow communication code execution completion data packet providing a notification that the corresponding communication code normally starts to the perimeter controller 210. Herein, the control flow communication code execution completion data packet may include control flow ID information for identifying the generated control flow and control flow communication code execution result information.

5) Receiving and Processing (S750) the Control Flow Communication Code Execution Completion When receiving the control flow communication code execution completion data packet from the PCFB 400, the perimeter controller 210 may search the control flow table for control flow information corresponding to the control flow ID included in the received data packet.

As a result of the search, where there is no control flow information corresponding to the corresponding control flow ID or when the corresponding control flow is present, but is not in an execution waiting state or in an unavailable state because an expiration time is exceeded, the perimeter controller 210 may stop receiving and processing the control flow code execution completion.

When the data packet protection technology is applied to the received control flow communication code execution completion data packet, the perimeter controller 210 may perform the reception process of the communication interval protection process. When it fails to receive and process it, the receiving and processing of the control flow code execution completion may be stopped.

When the receiving and processing of the control flow communication code execution completion is stopped, corresponding information may be deleted from the control flow table. Thus, the terminal—that is, the PCFB 400—should perform the control flow generation procedure again from scratch.

The perimeter controller 210 may change a status value of the control flow to a polling state and may update a polling expiration time by a certain time depending on a policy. Thereafter, the PCFB 400 may update the control flow communication code by means of continuous polling and may correspond to a series of requests the perimeter controller 210 needs.

When the receiving and processing of the control flow communication code execution completion is normally completed, the perimeter controller 210 may transmit a control flow generation completion data packet including a response code (a status value) to whether the generation of the control flow is completed to the PCFB 400. At this time, the status value may be set to 0 when normal and may be set to 1 when abnormal.

The perimeter controller 210 may use an additional protection technology, such as the transmission process of the communication interval protection process for improving a problem capable of being generated in an existing protocol when the control flow generation completion data packet is transmitted and for improved communication protection.

6) Receiving and Processing (S760) the Control Flow Generation Completion

The PCFB 400 may receive the control flow generation completion data packet from the perimeter controller 210.

When the data packet protection technology for the data packet is applied to the received data packet, the PCFB 400 may perform the reception process of the communication interval protection process. When it fails to receive and process it, the control flow generation procedure may be stopped.

When the status value included in the control flow generation completion data packet is abnormal, the PCFB 400 may end the control flow generation procedure.

When the status value included in the control flow generation completion data packet is normal, the PCFB 400 may execute polling logic included in the control flow communication code.

The PCFB 400 may identify whether the control flow generation procedure is in a currently ended state by means of continuous polling and may immediately correspond to various information requests from the perimeter controller 210.

Particularly, execution of a polling code may provide a secure network environment based on control flow by means of continuous monitoring for identifying various pieces of threat information in a zero trust terminal.

7) Control Request Process (S770)

When a control request from the perimeter controller 210 is needed, the terminal and the communication application may securely perform communication based on control flow using a virtualized application programming interface (API) included in the PCFB 400.

General control flow may provide a sufficient protection technology in a network communication interval, but protection for forgery and falsification of control flow generated in the terminal and transmission of threat data is not sufficient.

Particularly, because a code for generating control flow is not included in an application in an existing technology, ensuring of a control flow mechanism by means of reverse engineering and a man in the middle (MI™) attack are possible in view of a stealer.

However, because the control flow communication code operates in the form of a code which operates on a virtualized memory whenever control flow is generated by means of the above-mentioned control flow generation procedure, the present disclosure may provide an element which is difficult to attack control flow in view of the stealer.

Figure 8:
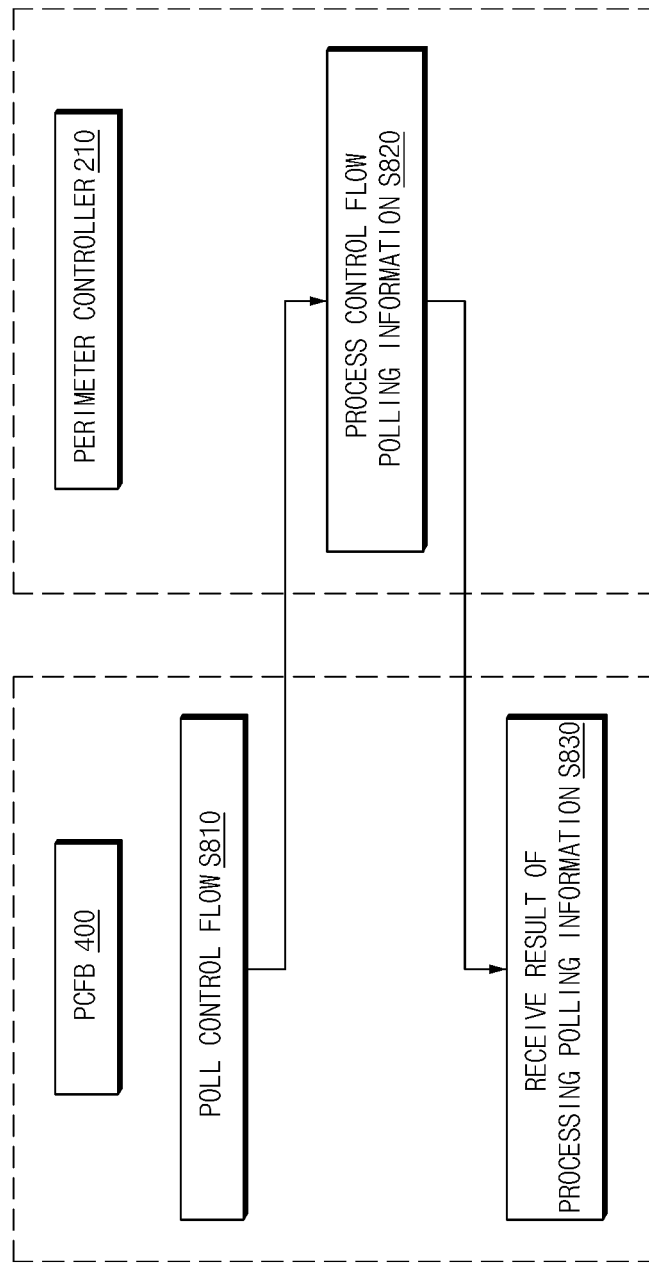
FIG. 8 is a drawing illustrating a control flow polling procedure according to an embodiment.

FIG. 8 is a drawing illustrating a control flow polling procedure according to an embodiment.

Referring to FIG. 8, the control flow polling procedure may be a procedure performed between a PFCB 400 and a perimeter controller 210, which may be configured including polling (S810) control flow, processing (S820) control flow polling information, and receiving (S830) the result of processing the polling information.

Hereinafter, a description will be given in detail of each step of the control flow polling procedure.

1) Polling (S810) the Control Flow

When polling logic is executed for the first time or when a polling time arrives according to a policy by means of continuous visual identification, the PCFB 400 may perform polling.

When an inspection code to be executed is present in a queue, the PCFB 400 may identify entry point information of the queue to execute the inspection code and may collect the result value.

After the execution of the inspection code is completed, the PCFB 400 may reduce the number of times of remaining execution of the queue. When the number of times of the remaining execution is 0, the PCFB 400 may remove the corresponding inspection code from the queue and may release the corresponding inspection code in a virtual machine 420.

The PCFB 400 may generate and transmit a polling processing data packet for providing a notification of operation state information to a perimeter controller 210 while executing the polling.

Herein, the polling processing data packet may include a control flow ID and inspection code execution result information.

An additional protection technology, such as a transmission process of a communication interval protection process, may be used for improving a problem capable of being generated in an existing protocol when the polling processing data packet is transmitted and for improved communication protection.

2) Polling (S820) the Control Flow

When the polling processing data packet is received from the PCFB 400, the perimeter controller 210 may search for control flow information corresponding to a control flow ID included in the received polling processing data packet with reference to a control flow table.

When there is no control flow information corresponding to the corresponding control flow ID in the control flow table or when the corresponding control flow is present, but is not in a polling state or in an unavailable state because an expiration time is exceeded, the perimeter controller 210 may stop processing the control flow polling information.

When the processing of the polling information is stopped, corresponding information may be deleted from the control flow table, and a terminal should perform the control flow polling procedure again from scratch.

The perimeter controller 210 may identify the inspection code execution result transmitted by the PCFB 400 based on the inspection code information which is present in the control flow.

When there is no required inspection code execution result or when the execution result value transmitted by the PCFB 400 is different from the inspection code information which is present in the control flow, the perimeter controller 210 may remove the corresponding control flow.

After the verification for the inspection code execution result is completed, the perimeter controller 210 may reduce the number of the remaining execution of the queue. When the number of times of the remaining execution arrives at 0, the perimeter controller 210 may remove the corresponding inspection code from the queue and may change a control flow state to polling processing.

The perimeter controller 210 may determine whether there is a patch for updating control flow set between the perimeter controller 210 and PCFB 400 based on a policy.

When the control flow needs the patch, the perimeter controller 210 may proceed with a patch procedure.

The perimeter controller 210 may identify whether it is necessary to execute the inspection code and a type of the inspection code to require to identify a harmful environment of the PCFB 400 and check whether there is forgery or falsification depending on the policy.

When it is determined that it is necessary to execute the inspection code, the inspection code, entry point information, a value (a valid or normal value) expected when the inspection code is executed, information about the number of times of being necessary for execution, or the like may be added to the corresponding control flow information. Herein, when it is necessary to execute the inspection code, the inspection code may be generated in real time, but this is merely an embodiment. The inspection code may be previously generated and may then be stored and maintained in a certain recording region.

The perimeter controller 210 may update an expiration time of the control flow.

As an example, when the polling expiration period by the policy is 30 seconds, a next expiration time may be updated by adding the current time to 30 seconds. At this time, the control flow state may be changed to polling waiting.

When there are a response code (a status value) to polling information processing and an inspection code to be executed, the perimeter controller 210 may transmit a polling information processing result data packet including the inspection code and incidental information to the PCFB 400.

An additional protection technology, such as a transmission process of a communication interval protection process, may be used for improving a problem capable of being generated in an existing protocol when the polling information processing result data packet is transmitted and for improved communication protection.

3) Receiving (S830) the Result of Processing the Polling Information

The PCFB 400 may receive the polling information processing result data packet from the control device 210.

When the protection technology is applied to the received polling information processing result data packet, the PCFB 400 may perform a reception process of the communication interval protection process. When it fails to receive and process it, the PCFB 400 may stop generating the control flow.

When a status value included in the polling information processing result data packet is abnormal, the PCFB 400 may be ended.

The PCFB 400 may identify whether an inspection code is included in the polling information processing result data packet.

When the inspection code is included as a result of the identification, the PCFB 400 may inject the inspection code into the virtual machine 420 and may add information such as an entry point and the number of times of execution to an inspection code execution queue to execute the corresponding inspection code upon next polling.

When the control flow polling procedure is completed, the PCFB 400 may wait for polling during a predetermined polling waiting time. When the polling waiting time elapses, the PCFB 400 may resume the control flow polling procedure.

Figure 9:
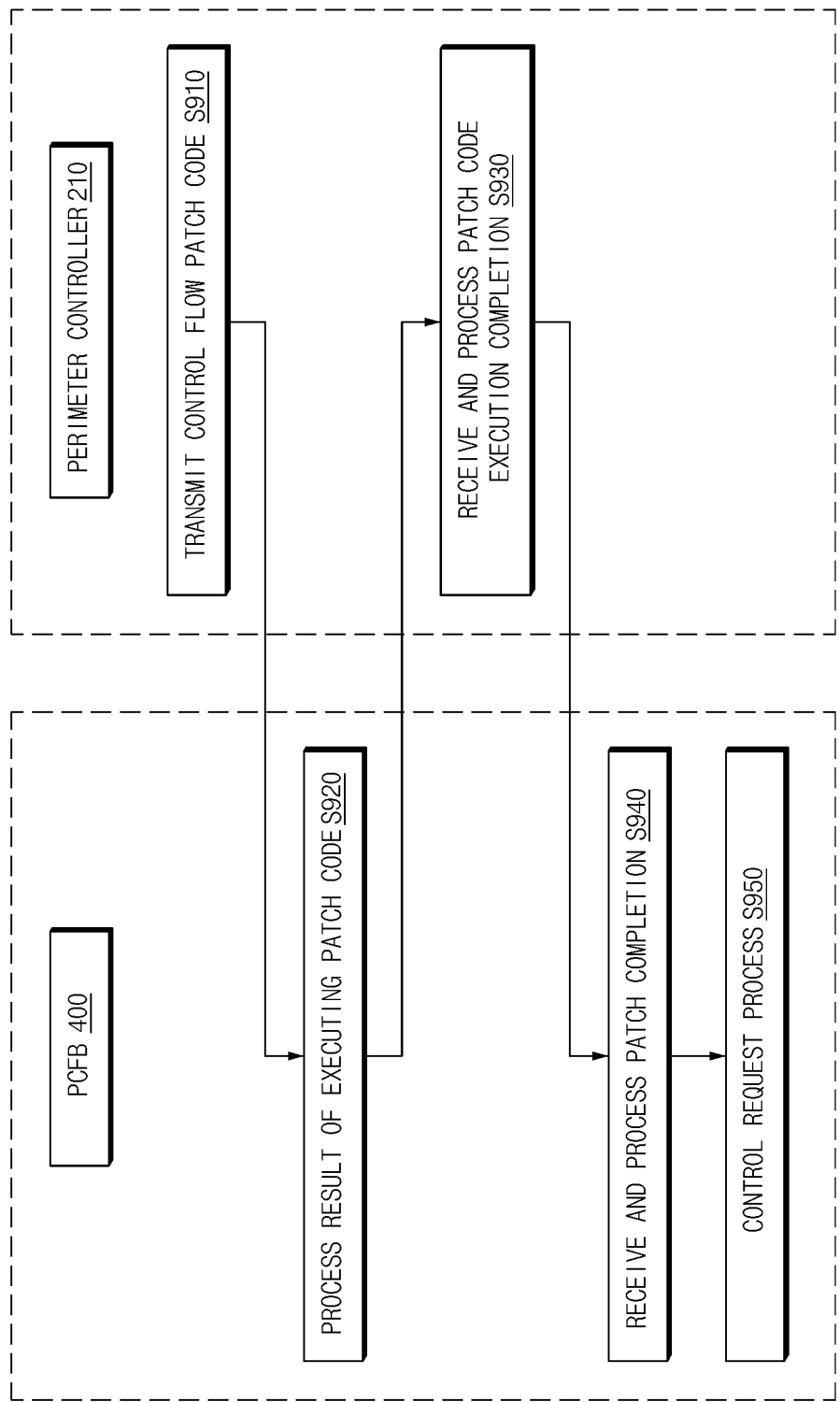
FIG. 9 is a drawing illustrating a control flow patch procedure according to an embodiment.

FIG. 9 is a drawing illustrating a control flow patch procedure according to an embodiment disclosure.

Referring to FIG. 9, the control flow patch procedure be implemented between a PCFB 400 and a perimeter controller 210, which may be configured including transmitting (S910) a control flow patch code, processing (S920) the result of executing the patch code, receiving and processing (930) patch code execution completion, receiving and processing (S940) patch completion, and a control request process (S950).

Hereinafter, a description will be given in detail of each step of the control flow patch procedure.

1) Transmitting (S910) the Control Flow Patch Code

When the patch procedure for updating control flow should be performed according to a policy, the perimeter controller 210 may generate a patch code suitable for a terminal and may reflect the previously generated patch code, entry point information, a new control flow ID, or the like in control flow information which is currently in use.

The patch according to the present embodiment refers to a procedure for newly changing various pieces of authentication information and encryption information capable of removing previously loaded control flow information for each certain time—that is, at a certain time period-, such that a stealer is difficult to track the control flow information loaded into the virtual machine 420 and the memory 430 of the PCFB 400, and generating and inferring new control flow.

The perimeter controller 210 may convert the state of the control flow into a patch waiting state and may update a patch expiration time.

As an example, when a patch expiration period by a policy is 60 seconds, the perimeter controller 210 may update a next expiration time by adding the current time to 60 seconds. When the patch is not completed up to the corresponding expiration time, the perimeter controller 210 may end the control flow patch process.

The perimeter controller 210 may transmit a control flow patch code data packet including a response code (a status) to polling information processing, a control flow patch code, and incidental information (data) to the PCFB 400. Herein, the incidental information may include an entry point and a control flow ID.

When the patch is needed according to the result of processing the polling information, the perimeter controller 210 may transmit a control flow patch code data packet including a status value (status: 2) indicating that the patch is needed to the PCFB 400.

2) Processing (S920) the Result of Executing the Patch Code

The PCFB 400 may receive the control flow patch code data packet from the perimeter controller 210.

When the protection technology is applied to the received control flow patch code data packet, the PCFB 400 may perform a reception process of a communication interval protection process. When it fails to receive and process it, the PCFB 400 may stop generating the control flow.

Furthermore, the status value corresponding to a response code to polling information processing of the received control flow patch code data packet is abnormal (status: 1), the PCFB 400 may be ended.

On the other hand, when the status value corresponding to a response code to polling information processing of the received control flow patch code data packet needs the patch (status: 2), the PCFB 400 may perform a similar procedure to the control flow generation procedure based on executing the control flow communication code for the first time.

This is because the control flow patch procedure is used as a method for protection from various threats by tracking of the memory 430 and an inferable threat by removing the control flow communication code which is previously in use and loading a new control flow communication code into the memory 430.

The PCFB 400 may inject a patch code included in the control flow patch code data packet into the virtual machine 420.

Herein, the injection may be implemented as direct code injection according to capacity of the patch code, or may be performed by being stored in the form of a file. As an example, when the capacity of the patch code is greater than or equal to a reference value, the patch code may be injected into the virtual machine 420 in the form of a file.

When the injection of the patch code is completed, the virtual machine 420 of the PCFB 400 may execute the injected patch code using the entry point information.

When the execution of the patch code is completed, the PCFB 400 may remove all of pieces of control flow information used for communication up to now and a previously generated file from the memory 430 and may perform communication using a control flow communication code newly patched on the memory 430 in all subsequent procedures.

When information for generating a tunnel when the control flow communication code is executed is included, the PCFB 400 may request the perimeter controller 210 to generate the tunnel using corresponding tunnel generation information.

Herein, the tunnel generation information may include a tunnel type (e.g., IPSec or the like) necessary to generate a tunnel, a tunneling scheme (e.g., an AH mode, an ESP mode, or the like), authentication information (e.g., a preshared key, a user ID, a password, or the like) for mutual key exchange, or the like, and an optimized tunnel technology may be applied according to an environment of the terminal.

A data packet may be securely protected in a transmission interval through the generated tunnel.

When it fails to generate the tunnel, the control flow generation procedure may be ended.

When the patch code is normally executed, the PCFB 400 may transmit a patch code execution completion data packet indicating that the control flow communication code normally starts to the perimeter controller 210.

Herein, the patch code execution completion data packet may include a control flow ID and patch code execution result information (data).

An additional protection technology, such as a transmission process of the communication interval protection process, may be applied for improving a problem capable of being generated in an existing protocol when the patch code execution completion data packet is transmitted and for improved communication protection.

3) Receiving and Processing (S930) the Patch Code Execution Completion

The perimeter controller 210 may receive the patch code execution completion data packet from the PCFB 400.

The perimeter controller 210 may search the control flow table for control flow information corresponding to the corresponding control flow ID based on the control flow ID included the received patch code execution completion data packet.

When there is no corresponding control flow information or when it is identified that the corresponding control flow information is present, but is in an unavailable state because the corresponding control flow is not in a patch waiting state or exceeds an expiration time, the perimeter controller 210 may stop receiving and processing patch code execution completion for the corresponding control flow ID.

When the data packet protection technology is applied to the patch code execution completion data packet, the perimeter controller 210 may perform the reception process of the communication interval protection process.

When the receiving and processing of the patch code execution completion is stopped, the corresponding control flow information may be deleted from the control flow table, and a terminal should perform the control flow generation procedure again from scratch.

When the execution of the patch code is normally completed, the perimeter controller 210 may change a status value of the corresponding control flow to a polling state and may reset a polling expiration time depending on the policy, such that the PCFB 400 subsequently performs continuous polling to update the control flow, thus controlling such that the PCFB 400 corresponds to a series of requests the perimeter controller 210 needs. At this time, the control flow information which is present prior to the patch may be deleted from the control flow table.

The perimeter controller 210 may transmit a patch completion data packet including a response code (a status) to whether the generation of the control flow is completed to the PCFB 400. The receiving and processing of the control flow patch code execution completion is normally completed, the status may be set to 0. When not so, the status may be set to 1.

An additional protection technology, such as the transmission process of the communication interval protection process, may be applied for improving a problem capable of being generated in an existing protocol when the patch completion data packet is transmitted and for improved communication protection.

4) Receiving and Processing (S940) the Patch Completion

The PCFB 400 may receive the path completion data packet from the control device 210.

When the protection technology is applied to the patch completion data packet, the PCFB 400 may perform the reception process of the communication interval protection process. When it fails to receive and process it, the PCFB 400 may stop generating the control flow.

When the status value included in the path completion data packet is abnormal, the PCFB 400 may end the control flow patch code execution procedure.

When the status value included in the path completion data packet is normal, the PCFB 400 may execute polling logic included in the control flow communication code.

The PCFB 400 may continue identifying whether the current state is an end state by means of continuous polling. The PCFB 400 may correspond to various information requests by the perimeter controller 210.

Particularly, the above-mentioned control flow polling procedure may always provide a secure network environment based on control flow by means of continuous monitoring for identifying various pieces of threat information in a zero trust terminal.

Figure 10:
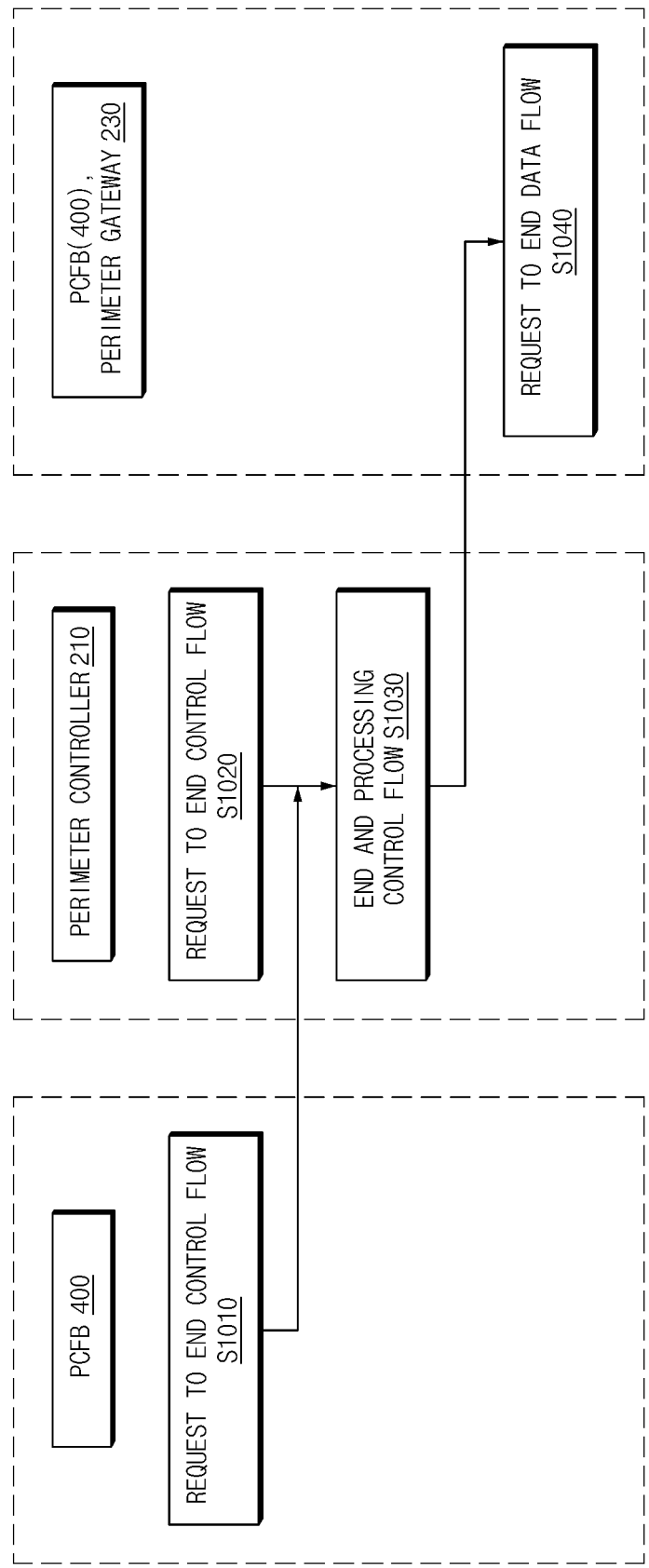
FIG. 10 is a drawing illustrating a control flow removal procedure according to an embodiment.

FIG. 10 is a drawing illustrating a control flow removal procedure according to an embodiment.

Referring to FIG. 10, as a PCFB 400, a perimeter controller 210, and a perimeter gateway 230 interwork with each other, the control flow removal procedure may be performed.

As an embodiment, the control flow removal procedure may be configured to including requesting (S1010 and S1020) to end control flow, ending and processing (S1030) the control flow, and requesting (S1040) to end data flow.

Hereinafter, a description will be given in detail of each step of the control flow removal procedure.

1) Requesting (S1010 and S1020) to End the Control Flow

The requesting to end the control flow may be performed by the PCFB 400 and (or) the perimeter controller 210.

The PCFB 400 may transmit a control flow end request packet to the perimeter controller 210. Herein, the control flow end request packet may include any one of a control flow ID capable of identifying end target control flow, an identifier of the PCFB 400, a terminal identifier, or an application identifier.

When an abnormal behavior and state such as occurrence of the reason for failing, stopping, or ending validity check, threat detection, failure to execute an inspection code, or update time lapse of control flow is detected in a process of performing all communication and procedures with the PCFB 400, the perimeter controller 210 may initiate the correspond control flow end procedure.

The perimeter controller 210 may remove control flow information corresponding to identification information such as the corresponding control flow ID from a control flow table depending on the control flow end request.

When the reason for the end is identified as that by the abnormal behavior when removing the control flow, the perimeter controller 210 may register identified information, such as a corresponding IP or a corresponding terminal ID, with a blacklist for temporary blocking or permanent blocking depending on a blacklist policy.

For the IP or the terminal ID registered with the blacklist, because access is fundamentally blocked from an initial control flow request procedure, the perimeter controller 210 may be protected from various threats.

2) Ending and Processing (S1030) the Control Flow

When ending the control flow, the perimeter controller 210 may remove all of pieces of data flow information associated with the corresponding control flow and may notify the connected perimeter gateway 230 and PCFB 400 (or the terminal) of the fact that data flow corresponding to the corresponding control flow is ended.

3) Requesting (S1040) to End the Data Flow

According to the notification of ending the data flow, the PCFB 400 (or the terminal) and the perimeter gateway 230 may recognize that the corresponding data flow is not used any longer.

As all of data flow is removed according to the ending and processing of the control flow, the PCFB 400 (or the terminal) may be in a state incapable of performing communication independently without the control flow or thus may be connected to a network, but is in a separation state incapable of actually transmitting a data packet.

Figure 11:
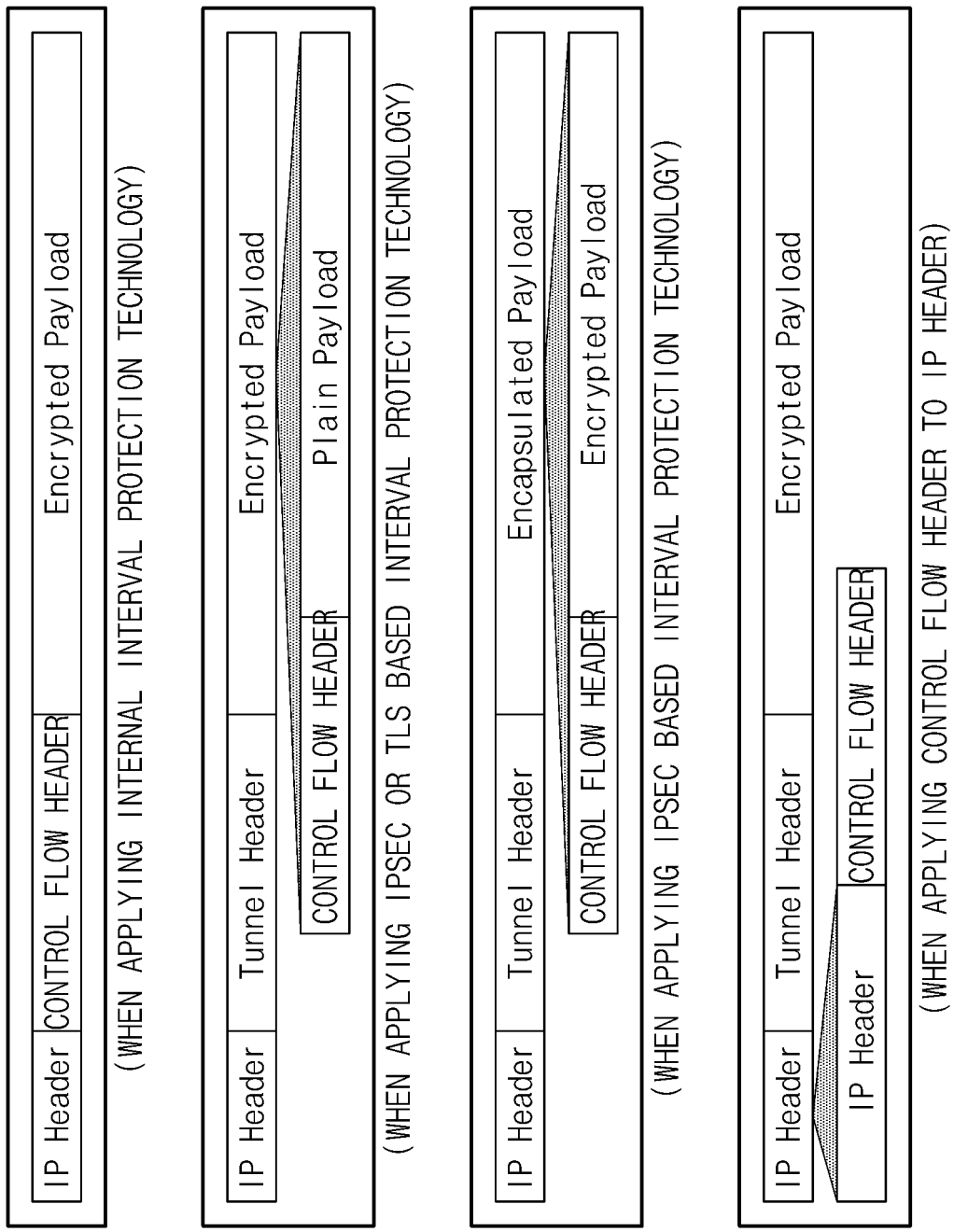
FIG. 11 is a drawing illustrating a communication interval protection procedure according to an embodiment.

FIG. 11 is a drawing illustrating a communication interval protection procedure according to an embodiment.

The communication interval protection procedure may be roughly divided into transmission processing and reception processing.

The transmission processing may include a function of preventing a random request using an HMAC-based one-time password (HOTP) algorithm or the like to protect a transmitted data packet and performing data integrity verification of request data for preventing data pollution capable of occurring on a communication interval.

Furthermore, the transmission processing may include an internal encryption function by means of an encryption key included when the PCFB 400 is distributed to protect data.

FIG. 11 shows various data packet structures applied to a communication protection technology.

Other than the structures shown in FIG. 11, a control flow header may be inserted into various intervals in a data packet.

The data packet may be used in a suitable form depending on situations of the terminal and the perimeter controller 210.

At this time, information (or a field) capable of being included in the control flow header may be as follows.

Identifier: may be an identifier for identifying control flow, which may be used as an identifier for identifying the terminal or the PCFB 400 prior to generating the control flow.

One time password: may be information generated by a random number generation algorithm such as an OTP for identifying that control flow information is transmitted between valid parties. An HOTP algorithm or a single packet authorization (SPA) technique may be used for the one time password.

Sequence: may count an order of data packets transmitted therebetween to prevent a main in the middle (MITM) attack and may prevent a non-ideal data packet from being interposed in the middle. When process processing is completed at each of transmission and reception sides, 1 may be added to an existing sequence value.

Integrity: may be information for checking integrity of a data packet, which may include a hash value including a tunnel header and a payload or information for verifying integrity.

The payload included in the data packet may be encrypted by means of a tunnel or an internal encryption algorithm according to an applied protection technology.

Figure 12:
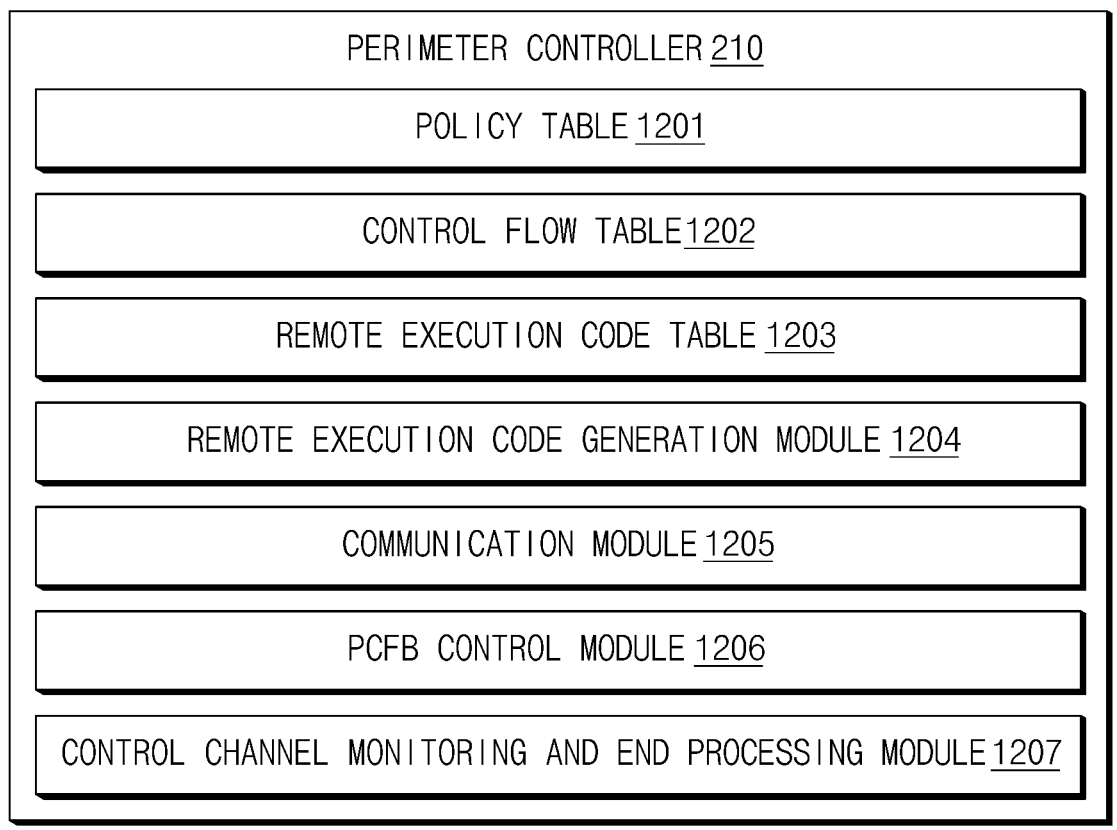
FIG. 12 is a block diagram illustrating a structure of a perimeter controller according to an embodiment of the present disclosure.

FIG. 12 is a block diagram illustrating a structure of a perimeter controller according to an embodiment of the present disclosure.

Referring to FIG. 12, a perimeter controller 210 may be configured including a policy table 1201 in which a control flow related policy is recorded, a control flow table 1202 in which control flow information for managing the generated control flow is maintained, a remote execution code table 1203 for previously generating and storing an inspection and patch code to be remotely executed, a remote execution code generation module 1204 for generating a remote code, a communication module 1205 for performing general communication and control flow based communication, a PCFB control module 1206 for processing various data packets received through the communication module 1205 and controlling to generate/delete/update the control flow, and a control channel monitoring and end processing module 1207 for ending and processing related control flow and data flow depending on the control flow table 1202 and various end conditions generated upon control flow control.

The control flow table 1202 is a kind of a session management table for managing generated flow (e.g., control flow) of a control data packet between a terminal (or a PCFB 400) and the perimeter controller 210. When the terminal successfully accesses the perimeter controller 210, control flow and identification information about the control flow may be generated by the perimeter controller 210. The control flow information may include at least one of identification information of the control flow, an IP address identified when accessing and authenticating the perimeter controller 210, a terminal ID, or a user ID. For example, when access to a destination network is requested from the terminal, the perimeter controller 210 may search for control flow information by means of the control flow identification information received from the corresponding terminal and may map at least one of the IP address, the terminal ID, or the user ID included in the found control flow information to an access policy, thus determining whether access of the terminal is possible and whether to generate a tunnel.

The policy table 1201 according to an embodiment may be configured including access policy information, tunnel policy information, blacklist policy information, or the like.

The access policy information may include information about an identified network, a network accessible by a terminal, a user or an application, and/or a service. For example, when access to the destination network is requested from the terminal, the perimeter controller 210 may determine whether the identified network (e.g., the network to which the terminal belongs), the terminal, the user (e.g., the user of the terminal), and/or the application (e.g., the application included in the terminal) is accessible to the destination network based on the access policy.

The tunnel policy information may include a type of a tunnel to be connected to a perimeter gateway 230 which is present at a boundary between a source node (e.g., a terminal) and the network on a connection path, an encryption method, and encryption level information. For example, when access to the destination network is requested from the terminal, the perimeter controller 210 may provide the terminal with an optimal tunnel for accessing the destination network and information thereof based on the tunnel policy.

The blacklist policy information may include information about a policy for permanently or temporarily blocking access of a specific terminal. The blacklist policy may be generated based on a risk level of a security event among security events collected on a periodic basis from the terminal or the gateway, a cycle of occurrence, and/or information identified by means of an action analysis (e.g., at least one of a terminal identifier (ID), an IP address, a media access control (MAC) address, a user ID).

The blacklist may include a list of at least one of a terminal, an IP address, a MAC address, or a user blocked by the blacklist policy. For example, when the terminal requesting to access the destination network is included in the blacklist, the perimeter controller 210 may deny the access request of the terminal to separate the terminal from the destination network.

Figure 13:
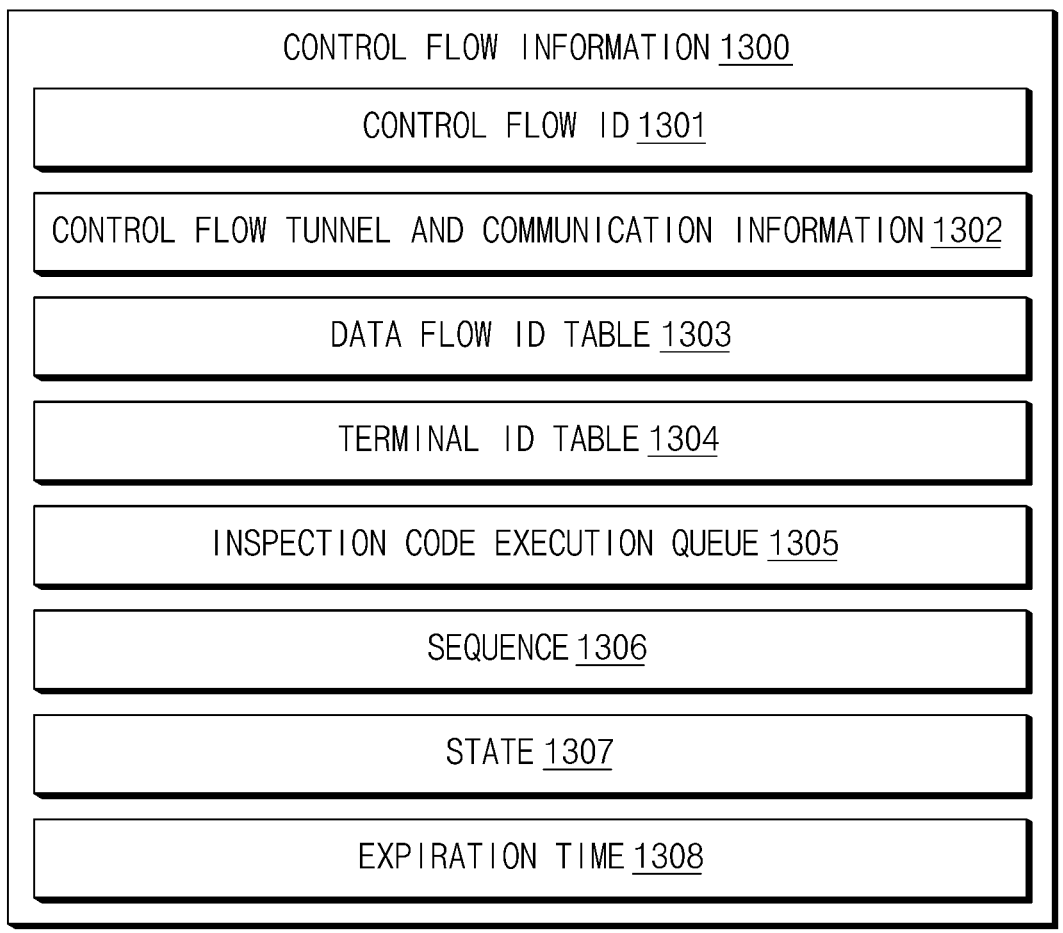
FIG. 13 is a drawing illustrating control flow information according to an embodiment of the present disclosure.

FIG. 13 is a drawing illustrating control flow information according to an embodiment of the present disclosure.

The control flow information may be managed for each control flow and may be maintained in a control flow table 1202.

Referring to FIG. 13, control flow information 1300 may be configured including information of at least one of a control flow ID 1301, control flow tunnel and communication information 1302, a data flow ID table 1303, a terminal ID table 1304, an inspection code execution queue 1305, a sequence 1306, a state 1307, and an expiration time 1308.

The control flow ID 1301 may be identifier information for uniquely identifying and managing control flow allocated to a PCFB 400.

The control flow tunnel and communication information 1302 may include tunneling information applied to control flow generated with the PCFB 400 and a series of pieces of information—for example, a validity verification scheme, an encryption key and a decryption key, a sequence, random number generation information, and the like—necessary for interval protection.

The data flow ID table 1303 may include identifier information for uniquely identifying data flow of a terminal, which is generated by means of the corresponding control flow. When the control flow is controlled, all of pieces of information about the data flow generated by means of the corresponding control flow may be removed. A perimeter controller 210 may transmit a certain data packet for providing a notification that the data flow is removed to the corresponding terminal (or the PCFB 400) when removing the corresponding data flow.

The terminal ID table 1304 may maintain unique identifier information of the terminal identified by means of the PCFB 400, IP information, user ID information, or the like. The perimeter controller 210 may perform access release processing with the corresponding terminal with reference to the terminal ID table 1304 when a threat occurs and may obtain identification information necessary for blacklist registration.

Furthermore, the control flow may be continuously maintained based on various pieces of identification information maintained in the terminal ID table 1304 when an IP is changed to assist in a mobility function of the terminal. In addition, pieces of information stored in the terminal ID table 1304 may be used as information for authorizing and authenticating access of the terminal as well as for the purpose of identifying an inspection code the corresponding terminal needs depending on a policy.

The inspection code execution queue 1305 may include inspection code information the PFCB 400 should execute.

The sequence 1306 may be information about an expected sequence value—that is, an expected value—.

When the PFCB 400 does not execute the inspection code or when a sequence of the received data packet is different from the expected value, the perimeter controller 210 may regard it as a threat and may remove the corresponding control flow.

The expiration time 1308 may refer to a time waiting until control flow polling information is received.

When transmitting the control flow polling information to the perimeter controller 210 prior to the expiration time 1308, and when the corresponding control flow is maintained, but when the control flow polling information is not received up to the expiration time 1308, the PCFB 400 may regard that the terminal is not in a normal operation state or that the threat occurs. The perimeter controller 210 may remove the corresponding control flow.

The perimeter controller 210 may update the expiration time 1308 depending on a policy, whenever the control flow polling information is normally received prior to the expiration time 1308.

Figure 14:
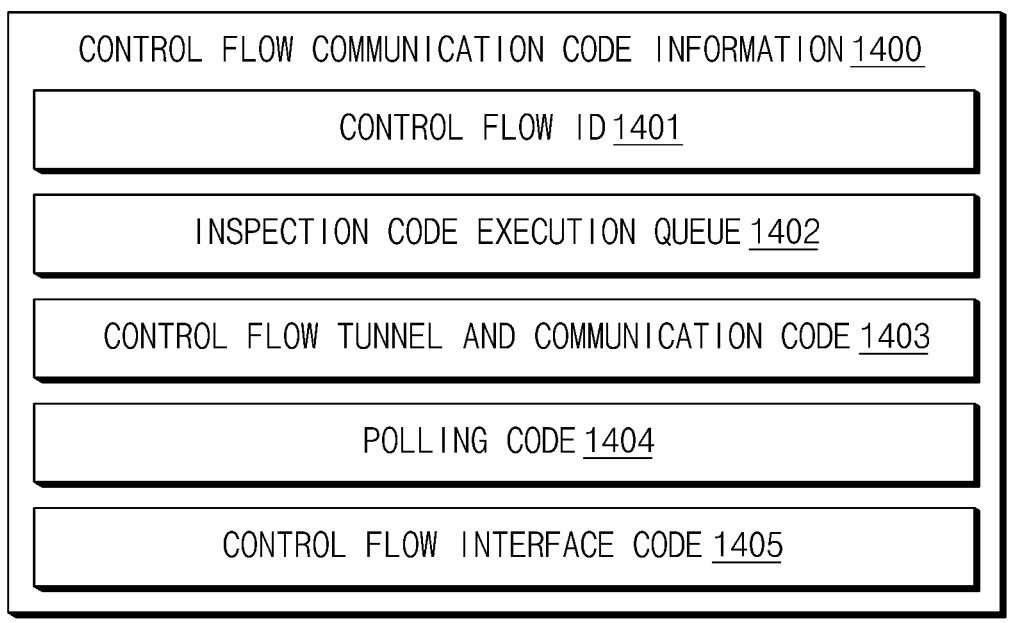
FIG. 14 is a drawing illustrating control flow communication code information deployed in a memory of a terminal or a PCFB according to an embodiment.

FIG. 14 is a drawing illustrating control flow communication code information deployed in a memory of a terminal or a PCFB according to an embodiment.

Referring to FIG. 14, control flow communication code information 1400 may be configured including a control flow ID 1401, an inspection code execution queue 1402 including inspection code information to be executed upon polling, a control flow tunnel and communication code 1403 including tunneling information applied to control flow to be generated between a PCFB 400 and a perimeter controller 210 and a series of pieces of information—for example, validity verification information, an encryption key and a decryption key, a sequence, random number generation information, and the like-necessary for interval protection, a polling code 1404 for continuously monitoring a state of a terminal or the PCFB 400 to maintain the control flow, and a control flow interface code 1405 for providing a virtual interface between an application and the PCFB 400.

Figure 15:
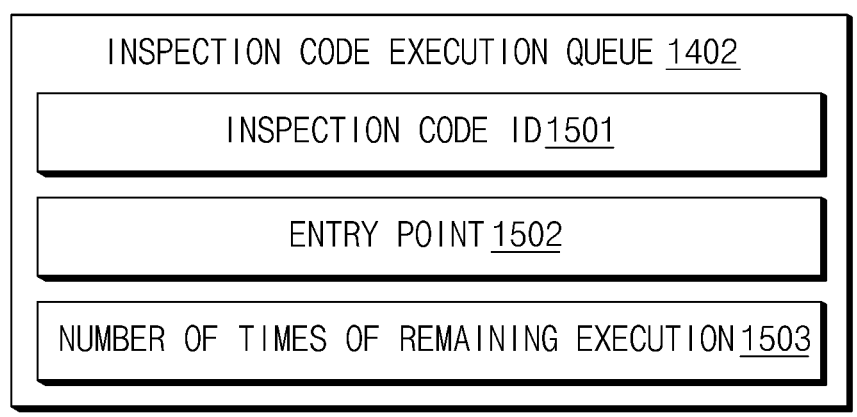
FIG. 15 is a drawing illustrating an inspection code execution queue maintained at a terminal according to an embodiment.

FIG. 15 is a drawing illustrating an inspection code execution queue maintained at a terminal according to an embodiment.

Referring to FIG. 15, information about an inspection code ID 1501 for uniquely identifying an inspection code, an entry point for executing the inspection code, and the number of times of remaining execution for how the inspection code will be continuously executed may be maintained in an inspection code execution queue 1402. A perimeter controller 210 may identify whether there is the result of executing any inspection code by means of the inspection code ID 1501.

Figure 16:
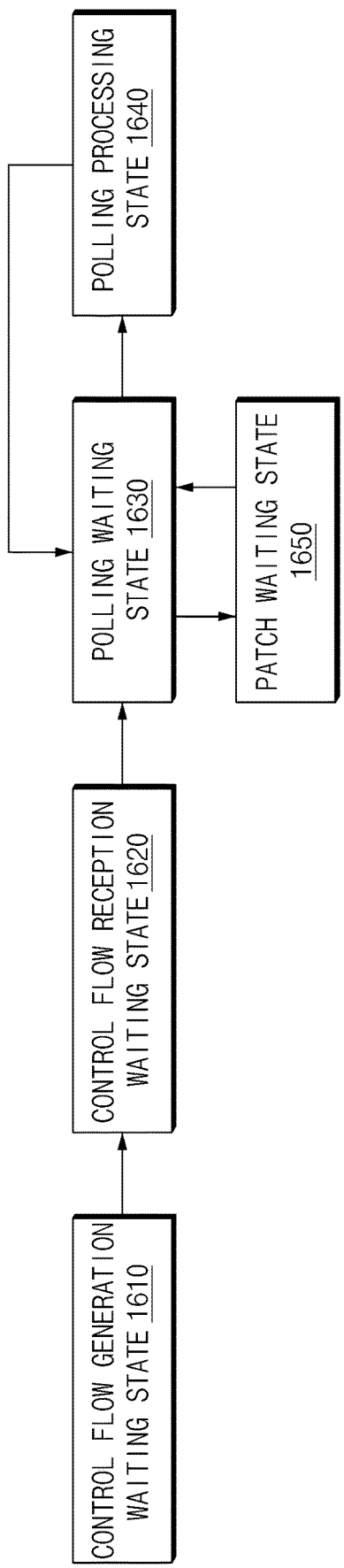
FIG. 16 illustrates a state diagram of a perimeter controller according to an embodiment.

FIG. 16 illustrates a state diagram of a perimeter controller according to an embodiment.

Referring to FIG. 16, a state diagram of a perimeter controller 210 may include a control flow generation waiting state 1610, a control flow reception waiting state 1620, a polling waiting state 1630, a polling processing state 1640, and a patch waiting state 1650.

The perimeter controller 210 may manage state information for managing a series of life cycles from generation of control flow to end of the control flow. When an abnormal request not to suit a status value occurs, the perimeter controller 210 may regard it as a threat to immediately perform a control flow end procedure.

The perimeter controller 210 may wait for a control flow generation request from a PCFB 400 in the control flow generation waiting state 1610.

When it is requested to generate control flow from the PCFB 400, the perimeter controller 210 may transmit a control flow communication code to the PCFB 400 and may enter the control flow reception waiting state 1620 to wait for receiving the result of executing the control flow communication code.

When the control flow communication code is normally executed, the perimeter controller 210 may enter the polling waiting state 1630 to wait for receiving control flow polling information.

When the control flow polling information is received in the polling waiting state 1630, the perimeter controller 210 may enter the polling processing state 1640 to process the control flow polling information and may enter the polling waiting state 1630 again when the processing is completed.

When occurrence of a threat is detected based on the control flow polling information received in the polling waiting state 1630, the perimeter controller 210 may generate and transmit a control flow patch code to the corresponding PFCB 400 and may enter the patch waiting state 1650.

When the patch code execution completion data packet is received in the patch waiting state 1650, the perimeter controller 210 may process it and may transition to the polling waiting state 1630 again.

The above description merely illustratively describe the technical idea of the present disclosure, and may be variously modified and altered by those skilled in the art to which the present disclosure pertains without departing from the spirit and scope of the present disclosure. Therefore, the embodiments disclosed in the present disclosure is not intended to limit the technical idea of the present disclosure and is intended to describe it, and the scope of the technical idea of the present disclosure is not limited by the embodiments. All the technical ideas within the scope equivalent to the present disclosure should be interpreted as being included in the present disclosure.

The invention claimed is:

1. A method for managing control flow in a terminal, the method comprising:
    transmitting a control flow generation request data packet to a server;
    receiving a control flow communication code from the server;
    loading and executing the received control flow communication code into a virtual machine; and
    transmitting an executed result, obtained by loading and executing the received control flow communication code into the virtual machine, to the server,
    wherein the control flow is generated, when the result of executing the control flow communication code is normal, and
    wherein the generation of the control flow is blocked by the server, when the executed result is abnormal or when the executed result is not received in the server within a certain time.

2. The method of claim 1, further comprising:
    transmitting a control flow communication code execution completion data packet indicating that the control flow communication code is normally executed to the server; and
    receiving a control flow generation completion data packet indicating that the generation of the control flow is completed from the server,
    wherein all requests of the terminal are transmitted to the server based on the generated control flow using a virtualized application protocol interface (API).

3. The method of claim 1, wherein the control flow communication code is a byte code executable in the virtual machine, is not stored in a separate disk, and is directly loaded and executed in real time on a memory of the virtual machine.

4. The method of claim 2, further comprising:
    starting to polling control flow, when a status value included in the control flow generation completion data packet is normal;
    executing an inspection code, when there is the inspection code to be executed during the polling; and
    transmitting control flow polling information including a result of executing the inspection code to the server,
    wherein a new patch code is received from the server, when it is determined that the patch is needed by the server based on the result of executing the inspection code.

5. The method of claim 4, wherein an existing control flow communication code is deleted from a memory of the virtual machine depending on receiving the patch code, and
    wherein the control flow is updated by means of execution of the patch code.

6. The method of claim 4, comprising:
    receiving a polling information processing result data packet including information about a new inspection code, an entry point for executing the new inspection code, and a number of times of remaining execution of the new inspection code through the control flow;
    loading the new inspection code into a memory of the virtual machine; and adding information about the entry point and the number of times of the remaining execution to an inspection code execution queue, wherein the new inspection code is executed with reference to the inspection code execution queue at a next polling time.

7. The method of claim 6, wherein the polling is performed at a certain period according to a predetermined policy, wherein the number of times of the remaining execution decreases by 1, whenever the polling is performed, and wherein the new inspection code is received from the server through the control flow and is loaded and executed on the memory, when the number of times of the remaining execution is 0.

8. The method of claim 1, further comprising:

transmitting a control flow end request data packet to the server, when corresponding to any one of when a status value of a received data packet is abnormal, when it fails to check validity of the received data packet, when a reason for end or stop occurs, when a threat is detected, when it fails to execute an inspection code, and when it fails to update the control flow, wherein the corresponding control flow and all data flow associated with the corresponding control flow are released according to the transmission of the control flow end request data packet.

9. The method of claim 1, further comprising:

requesting the server to generate a tunnel using tunnel generation information, when the tunnel generation information is included in the control flow communication code, wherein the tunnel generation information includes at least one of a tunnel type, a tunnel scheme, or authentication information for mutual key exchange.

10. A terminal for communicating with a server, the terminal comprising:

an execution module;

a memory loaded with the received control flow communication code; and a virtual machine configured to execute the loaded control flow communication code on the memory, wherein the terminal is configured to transmit a control flow generation request data packet to the server, receive a control flow communication code from the server, and transmit a result of executing for the control flow communication code to the server;

wherein the control flow is generated, when the result of executing for the control flow communication code is normal, and wherein the generation of the control flow is blocked by the server, when the executed result value is abnormal or when the executed result is not received in the server within a certain time.

11. The terminal of claim 10, wherein the terminal is further configured to:

transmit a control flow communication code execution completion data packet indicating that the control flow communication code is normally executed to the server; and receive a control flow generation completion data packet indicating that the generation of the control flow is completed from the server, wherein all requests of the terminal are transmitted to the server based on the generated control flow using a virtualized application protocol interface (API).

12. The terminal of claim 10, wherein the control flow communication code is a byte code executable in the virtual machine, is not stored in a separate disk, and is directly loaded and executed in real time on the memory of the virtual machine.

13. The terminal of claim 11, wherein the terminal is further configured to:

start to poll control flow, when a status value included in the control flow generation completion data packet is normal;

execute an inspection code, when there is the inspection code to be executed during the polling; and transmit control flow polling information including the result of executing the inspection code to the server, wherein a new patch code is received from the server, when it is determined that the patch is needed by the server based on the result of executing the inspection code.

14. The terminal of claim 13, wherein an existing control flow communication code is deleted from the memory of the virtual machine depending on receiving the patch code, and wherein the control flow is updated by means of execution of the patch code.

15. The terminal of claim 13, wherein the terminal is further configured to:

receive a polling information processing result data packet including information about the new inspection code, an entry point for executing the new inspection code, and a number of times of remaining execution of the new inspection code through the control flow;

load the new inspection code into the memory of the virtual machine; and add information about the entry point and the number of times of the remaining execution of the new inspection code to an inspection code execution queue, wherein the new inspection code is executed with reference to the inspection code execution queue at a next polling time.

16. The terminal of claim 15, wherein the polling is performed at a certain period according to a predetermined policy, wherein the number of times of the remaining execution of the new inspection code decreases by 1, whenever the polling is performed, and wherein the new inspection code is received from the server through the control flow and is loaded and executed on the memory, when the number of times of the remaining execution of the new inspection code is 0.

17. The terminal of claim 10, wherein the terminal is further configured to:

transmit a control flow end request data packet to the server, when corresponding to any one of when a status value of a received data packet is abnormal, when it fails to check validity of the received data packet, when a reason for end or stop occurs, when a threat is detected, when it fails to execute an inspection code, and when it fails to update the control flow, wherein the corresponding control flow and all data flow associated with the corresponding control flow are released according to the transmission of the control flow end request data packet.

18. The terminal of claim 10, wherein the terminal is further configured to:
  request the server to generate a tunnel using tunnel generation information, when the tunnel generation information is included in the control flow communication code,
  wherein the tunnel generation information includes at least one of a tunnel type, a tunnel scheme, or authentication information for mutual key exchange.

19. A method for managing control flow in a server, the method comprising:
  receiving a control flow generation request data packet from a terminal;
  transmitting a control flow communication code to the terminal; and
  receiving a result of executing for the control flow communication code from the terminal,
  wherein the control flow is generated with terminal, when the result of executing for the control flow communication code is normal, and
  wherein the generation of the control flow with the terminal is blocked, when the executed result value is abnormal or when the executed result is not received from the terminal within a certain time.

20. A system for managing control flow, the system comprising:
  a terminal configured to transmit a control flow generation request data packet to receive and execute a control flow communication code and transmit a result of executing for the control flow communication code;
  a server configured to generate the control flow communication code corresponding to the terminal when receiving the control flow generation request data packet or extract the control flow communication code corresponding to the terminal, the control flow communication code being previously generated and maintained in a remote execution code table, transmit the control flow communication code to the terminal, generate the control flow with the terminal, when the result of the control flow communication code is normal, and block generation of the control flow with the terminal, when the executed result value is abnormal or when the executed result is not received within a certain time; and
  a gateway configured to generate data flow between the terminal and a destination network under control of the server.

\* \* \* \* \*